United States Patent
Oryoji et al.

(10) Patent No.: US 12,215,643 B2
(45) Date of Patent: Feb. 4, 2025

(54) CONTROL DEVICE FOR INTERNAL COMBUSTION ENGINE

(71) Applicant: Hitachi Astemo, Ltd., Hitachinaka (JP)

(72) Inventors: Kazuhiro Oryoji, Hitachinaka (JP); Yoshihiko Akagi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/562,060

(22) PCT Filed: Feb. 2, 2022

(86) PCT No.: PCT/JP2022/003910
§ 371 (c)(1),
(2) Date: Nov. 17, 2023

(87) PCT Pub. No.: WO2022/264482
PCT Pub. Date: Dec. 22, 2022

(65) Prior Publication Data
US 2024/0229731 A1     Jul. 11, 2024

(30) Foreign Application Priority Data

Jun. 17, 2021 (JP) .................................. 2021-100667

(51) Int. Cl.
*F02D 41/00*     (2006.01)
*F02P 5/15*       (2006.01)

(52) U.S. Cl.
CPC ....... *F02D 41/0077* (2013.01); *F02D 41/009* (2013.01); *F02P 5/1502* (2013.01); *F02D 2200/024* (2013.01)

(58) Field of Classification Search
CPC ........... F02D 35/025–027; F02D 29/02; F02D 41/00; F02D 41/0007; F02D 41/009;
(Continued)

(56) References Cited

U.S. PATENT DOCUMENTS

| 8,688,353 B2 * | 4/2014 | Morimoto ........... F02D 41/1401 |
| | | 701/102 |
| 2004/0172934 A1 * | 9/2004 | Kita .................... F02D 41/0235 |
| | | 60/289 |

(Continued)

FOREIGN PATENT DOCUMENTS

| JP | 2001-271665 A | 10/2001 |
| JP | 2018-168699 A | 11/2018 |

(Continued)

OTHER PUBLICATIONS

International Search Report (PCT/ISA/210) issued in PCT Application No. PCT/JP2022/003910 dated Apr. 5, 2022 with English translation (4 pages).

(Continued)

*Primary Examiner* — Logan M Kraft
*Assistant Examiner* — Johnny H Hoang
(74) *Attorney, Agent, or Firm* — Crowell & Moring LLP

(57) ABSTRACT

Provided is a control device for an internal combustion engine capable of realizing an operation of the internal combustion engine in a state in which a dilution is close to a limit. A processor (CPU 23*a*) of a control device for an internal combustion engine calculates a change amount of a parameter (for example, a combustion center position) indicating a combustion state of the internal combustion engine (combustion center change amount calculation unit 32). The processor (CPU 23*a*) corrects an operation amount of an actuator (for example, an EGR valve) that adjusts a dilution of an air-fuel mixture according to a difference between the change amount of the parameter indicating the combustion state and a target value of the change amount, and brings the change amount close to the target value (actuator operation amount correction unit 33).

10 Claims, 11 Drawing Sheets

(58) Field of Classification Search
CPC .. F02D 41/0235; F02D 41/1473; F02D 41/18; F02D 2200/021; F02D 2200/022; F02D 2200/024; F02D 2200/0401; F02D 2200/0418; F02D 2200/0404; F02D 2200/0406; F02D 2200/0602; F02D 2200/101; F02P 15/1502; F01N 2/2006; F01N 2/32; F01N 2/22; Y02T 10/12; Y02T 10/40

See application file for complete search history.

(56) References Cited

U.S. PATENT DOCUMENTS

| | | | |
|---|---|---|---|
| 2008/0289600 A1* | 11/2008 | Kurotani | F02D 35/028 123/304 |
| 2011/0106408 A1* | 5/2011 | Morimoto | F02D 41/1401 701/102 |
| 2017/0314499 A1* | 11/2017 | Urano | F02D 35/023 |
| 2019/0063356 A1* | 2/2019 | Hoshi | F02D 35/028 |
| 2019/0264624 A1 | 8/2019 | Hagari | |
| 2019/0301406 A1* | 10/2019 | Watanabe | F02D 41/222 |
| 2020/0056553 A1 | 2/2020 | Yoneya et al. | |
| 2021/0047972 A1* | 2/2021 | Hagari | F02D 37/02 |
| 2021/0095603 A1* | 4/2021 | Muramatsu | F02D 41/2422 |
| 2022/0220908 A1 | 7/2022 | Sukegawa et al. | |

FOREIGN PATENT DOCUMENTS

| | | |
|---|---|---|
| JP | 2019-120204 A | 7/2019 |
| JP | 2019-143579 A | 8/2019 |
| JP | 2020-190234 A | 11/2020 |

OTHER PUBLICATIONS

Japanese-language Written Opinion (PCT/ISA/237) issued in PCT Application No. PCT/JP2022/003910 dated Apr. 5, 2022 with English translation (7 pages).

International Preliminary Report on Patentability (PCT/IB/388 & PCT/IB/373) issued in PCT Application No. PCT/JP2022/003910 dated Dec. 28, 2023, including English translation of Written Opinion (PCT/ISA/237) (6 pages).

* cited by examiner

CONTROL DEVICE FOR INTERNAL COMBUSTION ENGINE

TECHNICAL FIELD

The present invention relates to a control device for an internal combustion engine.

BACKGROUND ART

There are various methods for improving the fuel consumption performance of an automobile, but it is important to reduce fuel consumption of an internal combustion engine. In order to reduce the fuel consumption, it is effective to reduce various losses such as a pump loss, a cooling loss, and an exhaust loss generated during an operation of the internal combustion engine. As means for reducing the pump loss and the cooling loss, there are lean combustion in which a ratio of a fuel and the air is lean compared with a stoichiometric mixture ratio (theoretical mixture ratio) and a combustion method utilizing an exhaust gas recirculation (EGR) gas in which a part of a combustion gas is returned to an intake side to dilute a mixture of the fuel and the air. Hereinafter, lean combustion and a combustion method utilizing an EGR gas will be collectively referred to as "dilution combustion".

When this dilution combustion is used, an intake pipe pressure can be increased compared with a case where the dilution combustion is not used, such that the pump loss can be reduced under a condition that a load on the internal combustion engine is low. Since the heat capacity at the time of combusting the same amount of fuel can be increased compared with the case of not using dilution combustion, a combustion temperature of an air-fuel mixture can be lowered to reduce the cooling loss. Under a condition that a load on the internal combustion engine is high, reaction progress leading to a self-ignition reaction by introducing the EGR gas is suppressed, such that the occurrence of abnormal combustion can be suppressed. As a result, since an ignition timing can be advanced to approach an optimum timing, the exhaust loss can be reduced.

In order to reduce the fuel consumption, it is necessary to set an appropriate dilution of an air-fuel mixture (a gas fuel ratio described below) according to operation conditions. The dilution of the air-fuel mixture is often evaluated by a ratio between a sum of the mass of a mixed gas including air or an EGR gas and the mass of a fuel (gas-fuel ratio G/F), a mass ratio between air and a fuel (air-fuel ratio A/F), and a ratio of EGR in an intake gas (EGR ratio). Usually, the air-fuel ratio and the EGR ratio are adapted in advance for each vehicle type, and various actuators are operated to realize adapted values of the air-fuel ratio and the EGR ratio to satisfy the adapted state. At the time of adaptation, the air-fuel ratio and the EGR ratio are not set to a limit, but set with a margin (set margin) to some extent, in consideration of variations in machine differences of vehicles that appear on the market and changes in performance due to aging. Therefore, the setting of the dilution is smaller than a limit value of the dilution for each individual, and a potential for improvement in efficiency may remain.

In order to fully take the potential for efficiency improvement remaining by providing the margin of the dilution limit, it is effective to set the limit value of the dilution for each individual by detecting a combustion state during traveling and operating the dilution based on the detected state.

For example, there is an internal combustion engine control device described in JP 2020-190234 A (PTL 1). PTL 1 proposes combustion control of an internal combustion engine in which a combustion phase in which a combustion mass ratio estimated based on an output of a crank angle sensor is a set value is estimated, and a dilution and an ignition timing are operated such that the estimated combustion phase is the set phase.

CITATION LIST

Patent Literature

PTL 1: JP 2020-190234 A

SUMMARY OF INVENTION

Technical Problem

In Patent Literature, since a dilution can be operated based on the combustion phase, for example, a dilution that realizes a combustion phase defined in advance as a target value can be realized. On the other hand, the target value of the dilution is basically set with a margin, and does not become a limit value of the dilution. The realized combustion phase is an average state, and it is not guaranteed that a variation in the combustion state for each cycle is sufficiently small.

An object of the present invention is to provide a control device for an internal combustion engine capable of realizing an operation of the internal combustion engine in a state in which a dilution is close to a limit.

Solution to Problem

In order to achieve the above object, a control device for an internal combustion engine according to the present invention includes a processor configured to calculate a change amount of a parameter indicating a combustion state of the internal combustion engine, and correct an operation amount of an actuator that adjusts a dilution of an air-fuel mixture according to a difference between the change amount of the parameter indicating the combustion state and a target value of the change amount, and bring the change amount close to the target value.

Advantageous Effects of Invention

According to the present invention, it is possible to realize an operation of the internal combustion engine in a state in which the dilution is close to the limit. Problems, configurations, and effects other than those described above will become apparent through the following description of embodiments.

DESCRIPTION OF EMBODIMENTS

Hereinafter, embodiments of the present invention will be described in detail with reference to the drawings, but the present invention is not limited to the following embodiments, and various modification examples and application examples are also included in the technical concept of the present invention.

The present embodiment relates to a control device for an internal combustion engine, and particularly relates to control of a dilution of an air-fuel mixture according to a combustion state in an exhaust gas recirculation system or a system for diluting and combusting an air-fuel mixture of air and a fuel as in lean combustion, and control of an ignition device. An object of the present embodiment is to provide a control device for an internal combustion engine capable of realizing an operation of the internal combustion engine in a state close to a limit of a dilution that can be set for each engine body, for example, by estimating a change amount of a combustion state during traveling and operating a dilution and an ignition device based on the estimated change amount.

First Embodiment

Hereinafter, embodiments of the present invention will be described with reference to the drawings, and a configuration common to the following embodiments will be described with reference to FIGS. 1 to 3.

Figure 1:
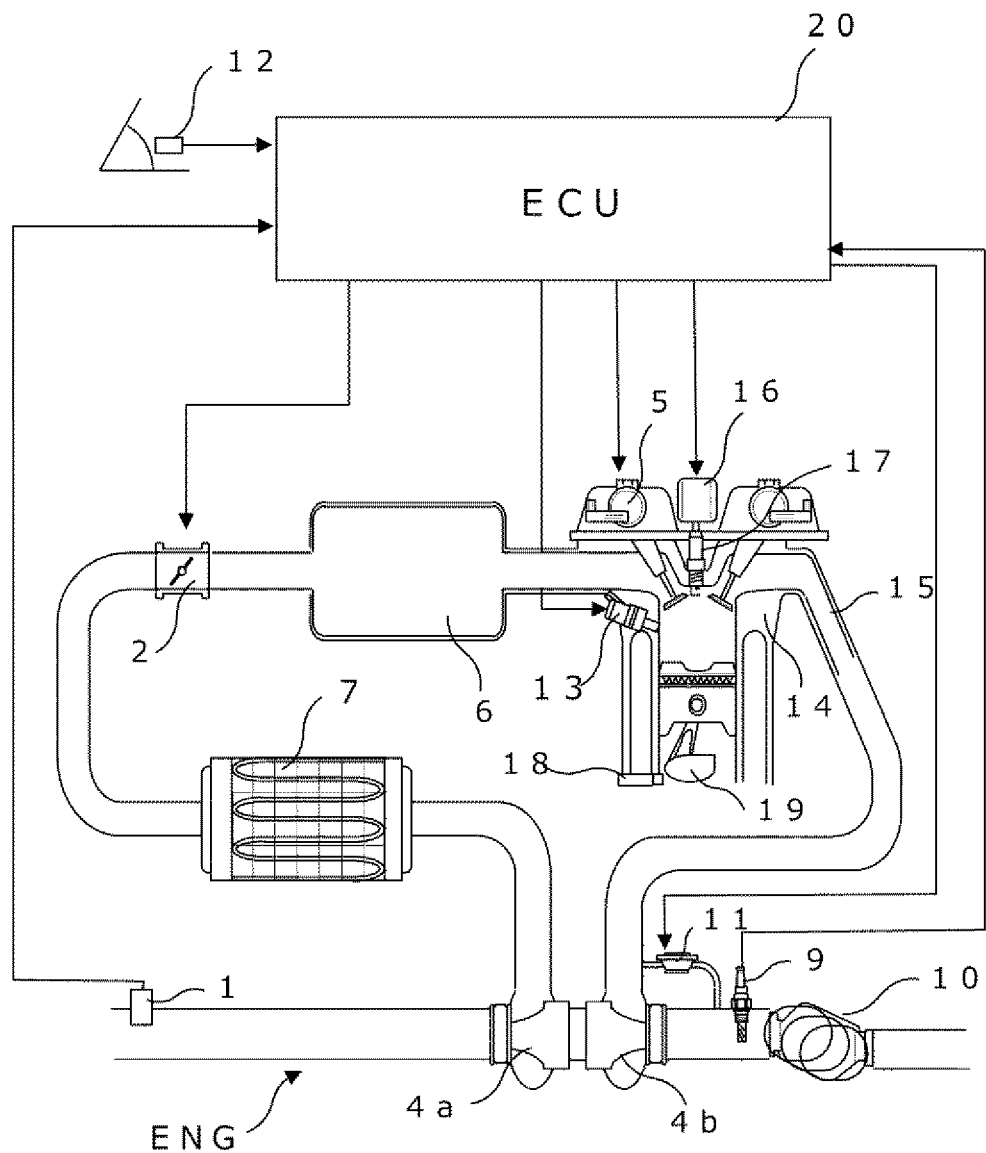
FIG. 1 is a configuration diagram illustrating a system configuration of an internal combustion engine.
Figure 2:
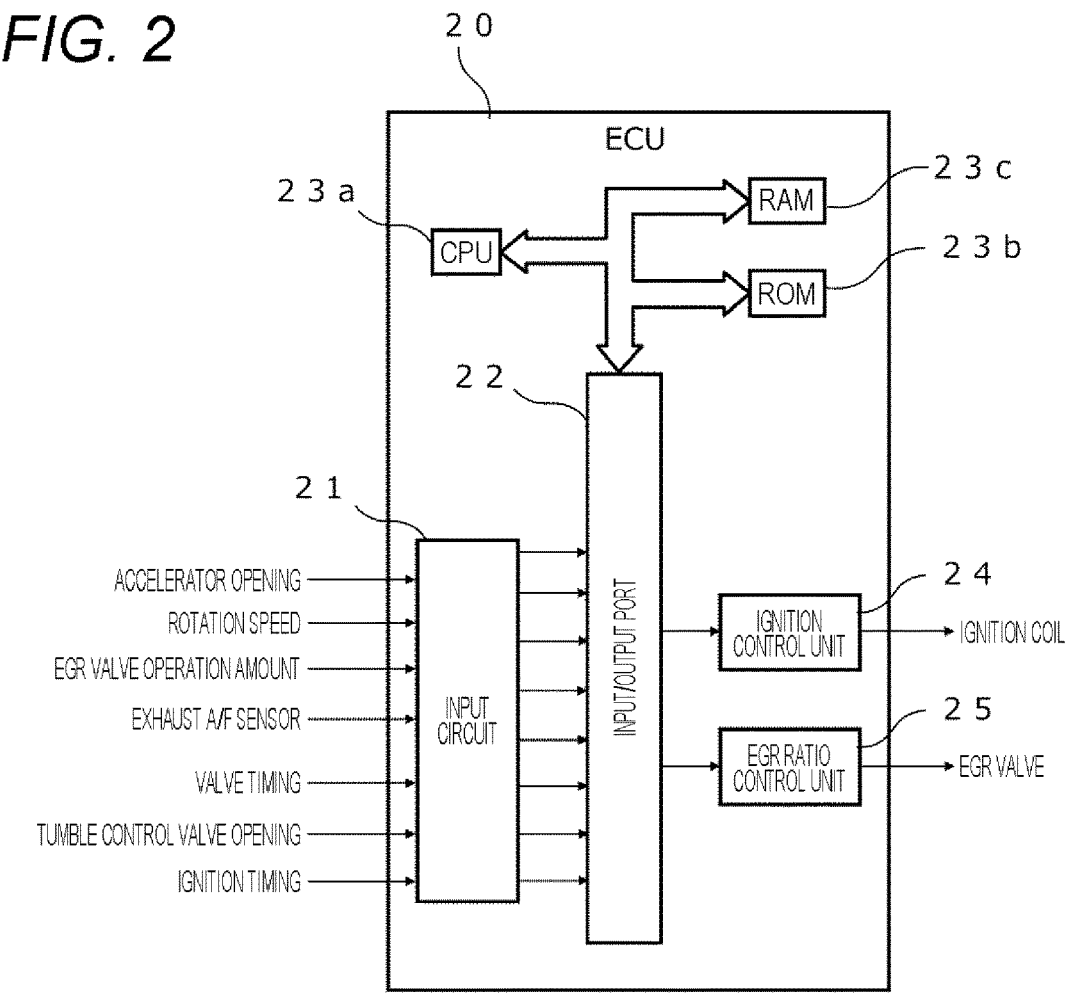
FIG. 2 is a configuration diagram illustrating a configuration of a control device for the internal combustion engine to which the present invention is applied.

FIG. 1 illustrates a system configuration of a spark ignition type internal combustion engine used in an automobile, which includes an in-cylinder fuel injection valve that directly injects a gasoline fuel into a cylinder.

An internal combustion engine ENG is an in-cylinder injection type internal combustion engine for an automobile that performs spark ignition combustion. An air flow sensor 1 that measures an intake air amount and an intake temperature, a compressor 4a of a supercharger for supercharging intake air, an intercooler 7 for cooling the intake air, and an electronically controlled throttle 2 for adjusting an intake pipe pressure are provided at appropriate positions of the intake pipe.

Here, a humidity sensor 3 is a sensor capable of detecting relative humidity and absolute humidity. The internal combustion engine ENG includes a fuel injection device 13 (injector) that injects a fuel into a cylinder 14 of each cylinder and an ignition device (hereinafter, an ignition coil 16 and a spark plug 17) that supplies ignition energy for each cylinder.

A cylinder head is provided with a variable valve 5 that adjusts an air-fuel mixture flowing into the cylinder or an exhaust gas discharged from the cylinder. An intake amount and an internal EGR amount of all the cylinders are adjusted by adjusting the variable valve 5.

Although not illustrated, a high-pressure fuel pump for supplying a high-pressure fuel to the fuel injection device 13 is connected to the fuel injection device 13 via a fuel pipe, and a fuel pressure sensor for measuring a fuel injection pressure is provided in the fuel pipe. A crank angle sensor 19 for detecting a piston position of the internal combustion engine is attached. Output information of the crank angle sensor 19 is transmitted to an ECU 20.

A turbine 4b for applying a rotational force to the compressor 4a of the supercharger by exhaust energy, an electronically controlled wastegate valve 11 for adjusting an exhaust flow rate flowing to the turbine 4b, a three-way catalyst 10 for purifying an exhaust gas, and an air-fuel ratio sensor 9 that is an aspect of an air-fuel ratio detector and detects an air-fuel ratio of an exhaust gas on an upstream side of the three-way catalyst 10 are provided at each appropriate position of the exhaust pipe 15. A temperature sensor 18 that measures the temperature of cooling water circulating in the internal combustion engine is provided. Although not illustrated, EGR pipes for returning the exhaust gas from the downstream side of the three-way catalyst 10 of the exhaust pipe to the upstream side of the compressor 4a of the intake pipe are provided. An EGR valve (EGR mechanism) for controlling an EGR flow rate is attached to the EGR pipe at an appropriate position of each of the EGR pipes.

Output information obtained from the air flow sensor 1, the temperature sensor 18, and the air-fuel ratio sensor 9 is sent to a control unit (ECU 20) that controls the internal combustion engine. Output information obtained from an accelerator opening sensor 12 is transmitted to the ECU 20. The accelerator opening sensor 12 detects a depression amount of an accelerator pedal, that is, an accelerator opening.

The ECU 20 calculates a required torque based on the output information of the accelerator opening sensor 12. That is, the accelerator opening sensor 12 is used as a required torque detection sensor that detects a required torque to the internal combustion engine. The ECU 20 calculates a rotation speed of the internal combustion engine based on the output information of the crank angle sensor. The ECU 20 optimally calculates main operation amounts of the internal combustion engine such as an air flow rate, a fuel injection amount, an ignition timing, and a fuel pressure based on an operation state of the internal combustion engine obtained from the output information of the various sensors.

The fuel injection amount calculated by the ECU 20 is converted into a valve opening pulse signal and sent to the fuel injection device 13. An ignition signal is sent to the ignition coil 16 such that ignition is performed at the ignition timing calculated by the ECU 20. The throttle opening calculated by the ECU 20 is sent to the electronically controlled throttle 2 as a throttle drive signal.

A fuel is injected into the air flowing into the cylinder 14 from the intake pipe through the intake valve to form an air-fuel mixture. The air-fuel mixture explodes due to a spark generated from the spark plug 17 at a predetermined ignition timing, and the piston is pushed down by the combustion pressure to generate a driving force of the internal combustion engine. An exhaust gas after the explosion is sent to the three-way catalyst 10 via the exhaust pipe 15, and exhaust components are purified in the three-way catalyst 10 and discharged to the outside.

In such an internal combustion engine system, next, details of the present embodiment will be described. FIG. 2 illustrates a control block illustrating a configuration of a control device for an internal combustion engine to which the present invention is applied. Input signals such as air amount information from the air flow sensor 1, accelerator depression information from the accelerator opening sensor 12, and angle information from the crank angle sensor 19 are input to an input circuit 21 of the ECU 20 that is control means. However, since input signal is not limited to these signals, input signals will be added and described as appropriate.

The input signal that has been input from each sensor is transmitted to an input port of an input/output port 22. The input information sent to the input port is temporarily stored in a RAM 23c, and is subjected to a calculation process by the CPU 23a according to a predetermined control program. A control program describing the contents of the calculation process is written in a ROM 23b in advance.

Output information indicating an operation amount for the fuel injection valve or the ignition coil for controlling the internal combustion engine, calculated according to the control program, is temporarily stored in the RAM 23c, then sent to an output port of the input/output port 22, and sent to the fuel injection valve and the ignition coil through respective drive circuits. Although actuators other than these are also used in the internal combustion engine, the description thereof is omitted here.

In the case of the present embodiment, an ignition control unit 24 and an EGR ratio control unit 25 are illustrated as drive circuits, the ignition control unit 24 controls an energization timing, an amount of discharge energy, and the like for the ignition coil, and the EGR ratio control unit controls an opening of the EGR valve. In the present embodiment, an ignition control unit 24 for controlling an energization time and an amount of discharge energy for the ignition coil is provided in the ECU 20, but the present invention is not limited thereto, and a part of the ignition control unit 24 or the entire ignition control unit 24 may be mounted on a device different from the ECU 20. The same applies to the EGR ratio control unit 25.

The ECU 20 calculates the discharge energy of the spark plug according to the detected air amount, crank angle, cooling water temperature, intake temperature, and the like, energizes the ignition coil at an appropriate timing (an energization time or an ignition timing) to ignite the air-fuel mixture in the cylinder, and energizes a motor that operates the opening of the EGR valve to control the opening of the EGR valve.

Figure 3:
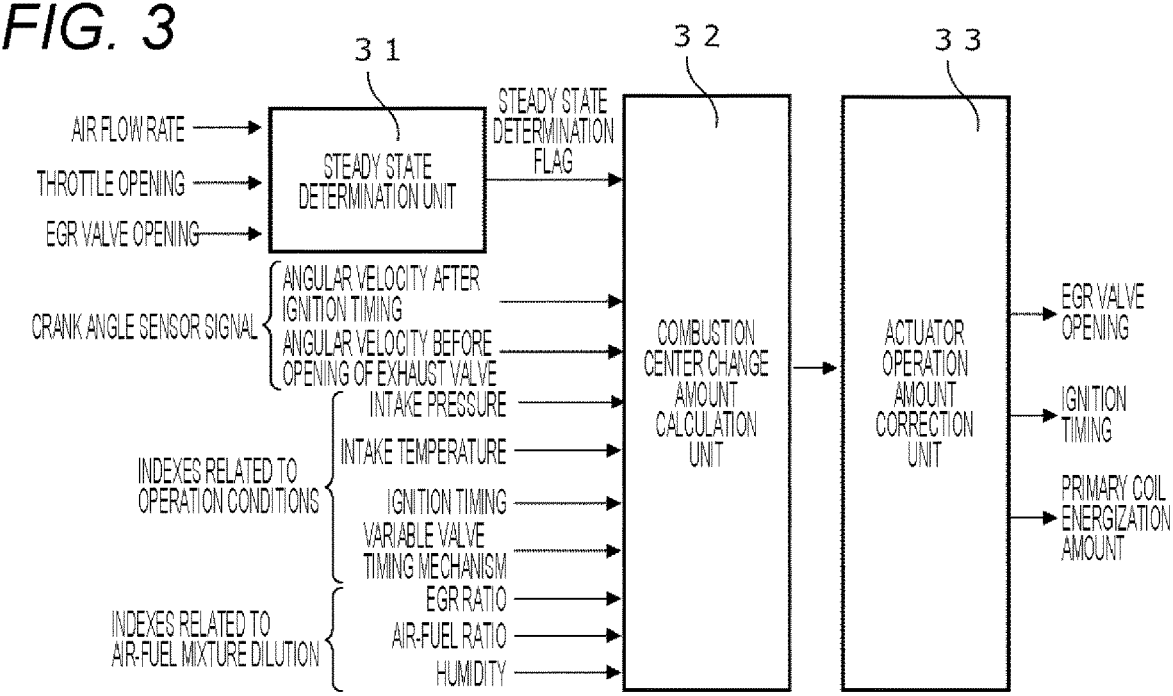
FIG. 3 is a control block diagram according to an embodiment of the present invention.

FIG. 3 is a control block illustrating an outline of discharge energy control performed by the ignition control unit 24 and the EGR ratio control unit 25 in the ECU 20 that is a control device for the internal combustion engine according to the embodiment of the present invention. A steady state determination unit 31 determines whether an operation state of the engine is a steady state based on actuator operation amounts of the intake system such as the detected air flow rate, throttle opening, and EGR valve opening, and detection values. The determination result is sent to a combustion center change amount calculation unit 32.

The combustion center change amount calculation unit 32 calculates an change amount of a combustion center position based on the crank angle sensor signal, particularly, the vicinity of the ignition timing, before the exhaust valve opening timing, indexes related to the operation conditions (an intake pressure, an intake temperature, an ignition timing, and a valve timing such as a variable valve timing), and indexes related to the air-fuel mixture dilution (an EGR ratio, an air-fuel ratio, and a humidity). The calculated change amount of the combustion center position is input to an actuator operation amount correction unit 33. The actuator operation amount correction unit 33 sets operation amounts such as an EGR valve opening, an ignition timing, and a primary coil energization amount based on an estimated change amount of the combustion center position or a combustion center position.

Figure 4A:
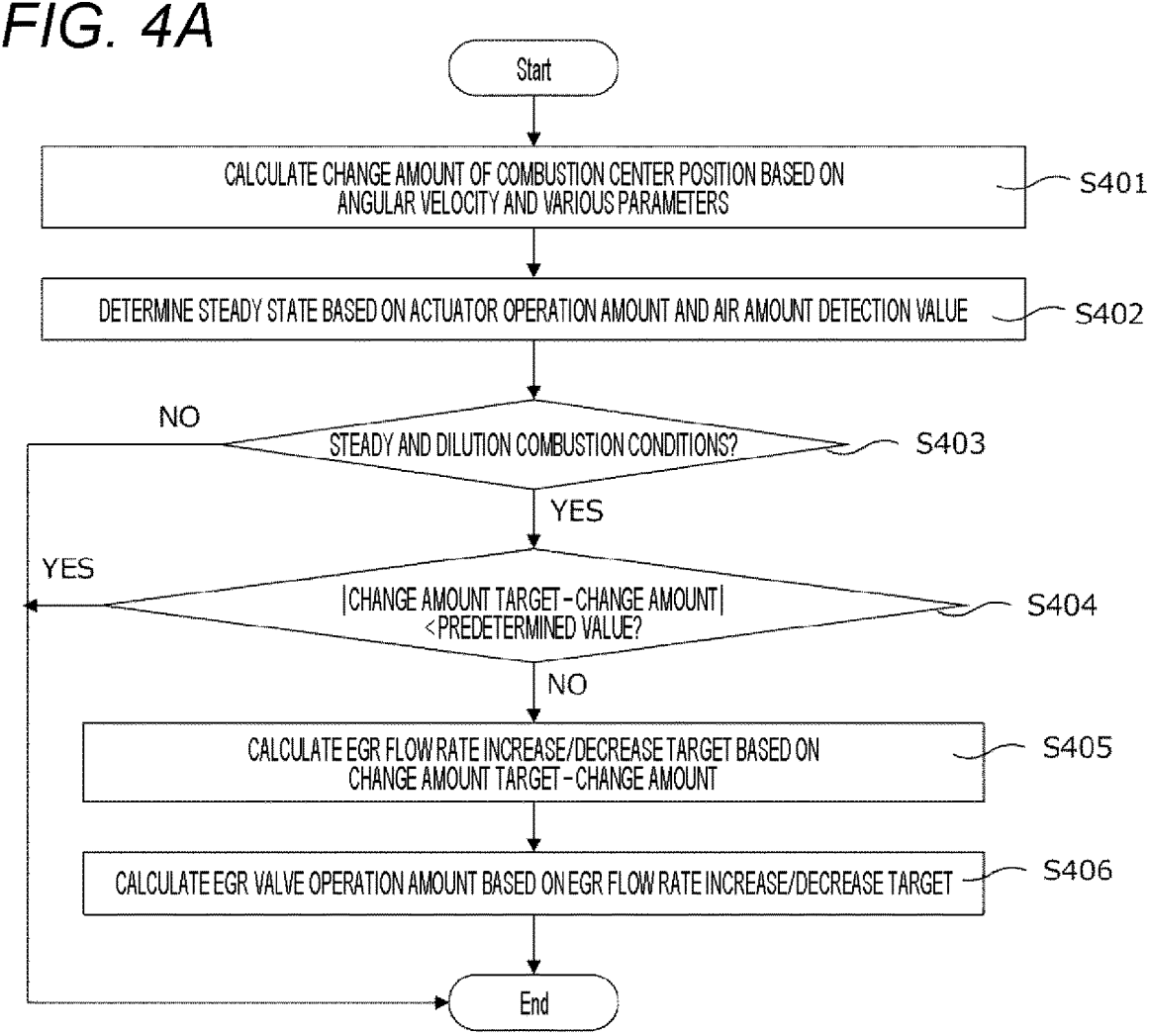
FIG. 4A is a control flowchart for describing a control step executed by the control block according to the embodiment of the present invention.

FIG. 4A illustrates a control flow of a calculation process for dilution control according to the first embodiment. Step S401 is a process executed by the combustion center change amount calculation unit 32, step S402 is a process executed by the steady state determination unit 31, and steps S403 to S406 are processes executed by the actuator operation amount correction unit.

[Step S401]

In step S401, a change amount of the combustion center position is calculated based on the angular velocity and various parameters. The detailed process here will be separately described.

[Step S402]

In step S402, a steady state determination is performed based on the actuator operation amounts and the air amount detection values. Specifically, the determination is performed based on the fact that a change amount of each of the actuator operation amounts and the air amount detection values within a predetermined period is less than a predetermined value. In a case where the change amount within the predetermined period is less than the predetermined value, a steady state determination flag is set to 1, and in a case where the condition is not satisfied, the steady state determination flag is set to 0. For example, the predetermined period may be set to 500 ms, and the predetermined value may be set to 10%.

[Step S403]

In step S403, it is determined whether a steady condition and a dilution combustion condition are established from the opening of the EGR valve. Whether or not the steady condition is established is determined based on the steady state determination flag set in step S402. Whether or not dilution combustion state is established is determined based on whether or not the EGR valve is fully closed. When the EGR valve is fully closed, it is determined that the dilution condition is not established. Therefore, in a case where the steady state determination flag is 1 and the EGR valve opening is not fully closed, the process proceeds to step S404. In a case where the steady state determination flag is 0 or the EGR valve opening is fully closed, the flow is ended.

[Step S404]

In step S404, it is determined whether an absolute value of a difference between the change amount of the combustion center position and a change amount target value is smaller than a predetermined value. The fact that the absolute value of the difference is smaller than the predetermined value indicates that the operation can be performed under a condition close to the allowable change amount. In a case where the absolute value of the difference is equal to or more than the predetermined value, the process proceeds to step S405. On the other hand, in a case where the absolute value of the difference is smaller than the predetermined value, the flow is ended.

[Step S405]

In step S405, an EGR flow rate increase/decrease target based on a difference between the change amount target of the combustion state and the change amount of the combustion state is calculated. In a case where the change amount is smaller than the change amount target (in a case where the difference between the change amount target and the change amount is positive), the EGR flow rate is operated to be increased. In a case where the change amount is larger than the change amount target (in a case where the difference between the change amount target and the change amount is negative), the EGR flow rate is operated to be decreased. For example, EGR flow rate increase/decrease rate target value may be calculated according to the following equation.

EGR flow rate increase/decrease rate target value=C×air flow rate×(change amount target−change amount)

Here, C is an adaptation coefficient, and the parameter may be determined based on an experiment. As described above, by determining the EGR flow rate increase/decrease target based on the difference between the change amount target of the combustion state and the change amount of the combustion state, the EGR flow rate increase/decrease rate can be changed according to the difference between the change amount of the combustion state and the change amount target, and time point to reach a more optimal condition can be reduced. For example, a change amount of the combustion state under a condition that an output fluctuation rate of the engine is an allowable value may be set as the change amount target value of the combustion state.

[Step S406]

Figure 4B:
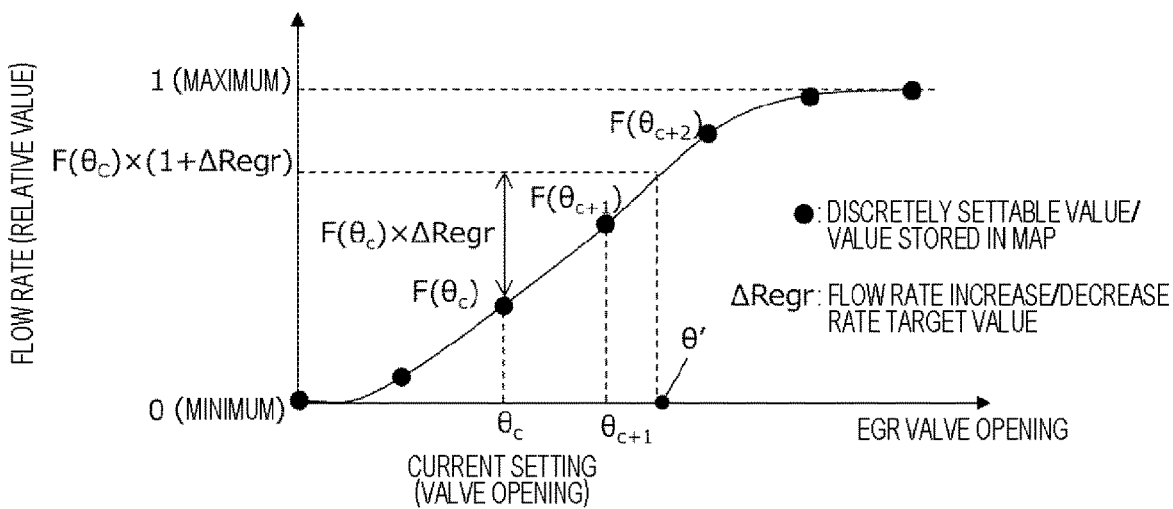
FIG. 4B is a diagram illustrating a relationship between an EGR valve opening and a flow rate relative value.

In step S406, an EGR valve operation amount is calculated based on the EGR flow rate increase/decrease rate target value determined in step S405. Examples are shown below. FIG. 4B illustrates a relationship between an EGR valve opening and a flow rate. In FIG. 4B, a flow rate is normalized to 0 to 1 by setting a value at the flow rate of the valve opening corresponding to fully opening to 1 and the value at the valve opening corresponding to fully closing to 0. Change amounts of the EGR valve opening and the normalized flow rate may be measured in advance through an engine test or simulation, and may be used for control by being stored in the ECU as a map of the flow rate with the EGR valve opening as an axis. In the following description, a relationship between the valve opening and the normalized flow rate is expressed as follows.

Relative flow rate value=$F$(EGR valve opening)

The EGR flow rate increase/decrease rate target value calculated in step S405 is denoted by $\Delta Regr$, and the EGR valve opening at the present time is denoted by $\theta$. In this case, a target value of the EGR flow rate is expressed by the following relationship.

Target value of EGR flow rate = $F(\theta_c) \times (1 + \Delta Regr)$

First, as one of cases, a case where an operation for the EGR valve can be discretely performed will be described. Here, a black circle in FIG. 4B indicates a relationship between an EGR valve opening and a flow rate that can be set discretely. In the present case, it is assumed that a relationship between a settable opening and a flow rate is stored as a map. That is, the black circle in FIG. 4B means a settable EGR valve opening condition and a value stored on the map. In a case where the EGR valve can be operated discretely, it is important to set the opening of the EGR valve within a range not exceeding this target value when the opening of the EGR valve is changed.

For example, in the case illustrated in FIG. 4B, since the target value ($F(\theta_C) \times (1+\Delta Regr)$) of the EGR flow rate is more than the flow rate ($F(\theta_{C+1})$) of the valve opening $\theta_{C+1}$, it is necessary to set the target value of the EGR valve opening to $\theta_{C+1}$ in order to make the EGR flow rate equal to or more than the target value and not to make the combustion state unstable. Therefore, in the present case, the target value of the EGR valve opening can be $\theta_{C+1}$. By setting the opening of the EGR valve as described above, the EGR valve opening can be set within a range in which the realized EGR flow rate does not exceed the target value, and the unstable combustion state at the time of operating the EGR valve can be suppressed.

Next, a case where an operation amount of the EGR valve can be continuously set will be described. In this case, the opening of the EGR valve can be set more finely. In the following description, the black circles in FIG. 4B mean values stored on the map. Since a target value of the EGR flow rate is between $F(\theta_{C+2})$ and $F(\theta_{C+1})$ on the map, a target value e' of the EGR valve opening may be given according to the following relationship by using these values and $\theta_{C+2}$ and $\theta_{C+1}$.

Target value $\theta'$ = $A \times$ (target value of EGR flow rate $- F(\theta_{C+1})) + \theta_{C+1}$ $A = (\theta_{C+2} - \theta_{C+1}) \div (F(\theta_{C+2}) - F(\theta_{C+1}))$ By setting the target value of the EGR valve opening as described above, the realized EGR flow rate can be brought close to the target value assumed in step S405. As a result, the EGR flow rate can be increased within a range in which combustion instability can be suppressed, and efficiency can be further improved.

Note that, in the above description, the processing has been described assuming a case where a relationship between the EGR valve opening and the EGR flow rate is given according to the map, but the same concept can also be applied to a case where a relationship between the EGR valve opening and the EGR flow rate is given according to an equation.

According to the above processing, it is possible to operate a dilution according to a change amount of the combustion state, it is possible to set the dilution based on a dilution range that can be set for each individual, and it is possible to set the optimum dilution on-board. By determining the flow rate increase/decrease target based on the difference between the change amount target of the combustion state and the change amount of the rate combustion state, the EGR flow increase/decrease rate can be changed according to the difference between the change amount of the combustion state and the change amount target, and time point to reach a more optimal condition can be reduced.

Figure 5:
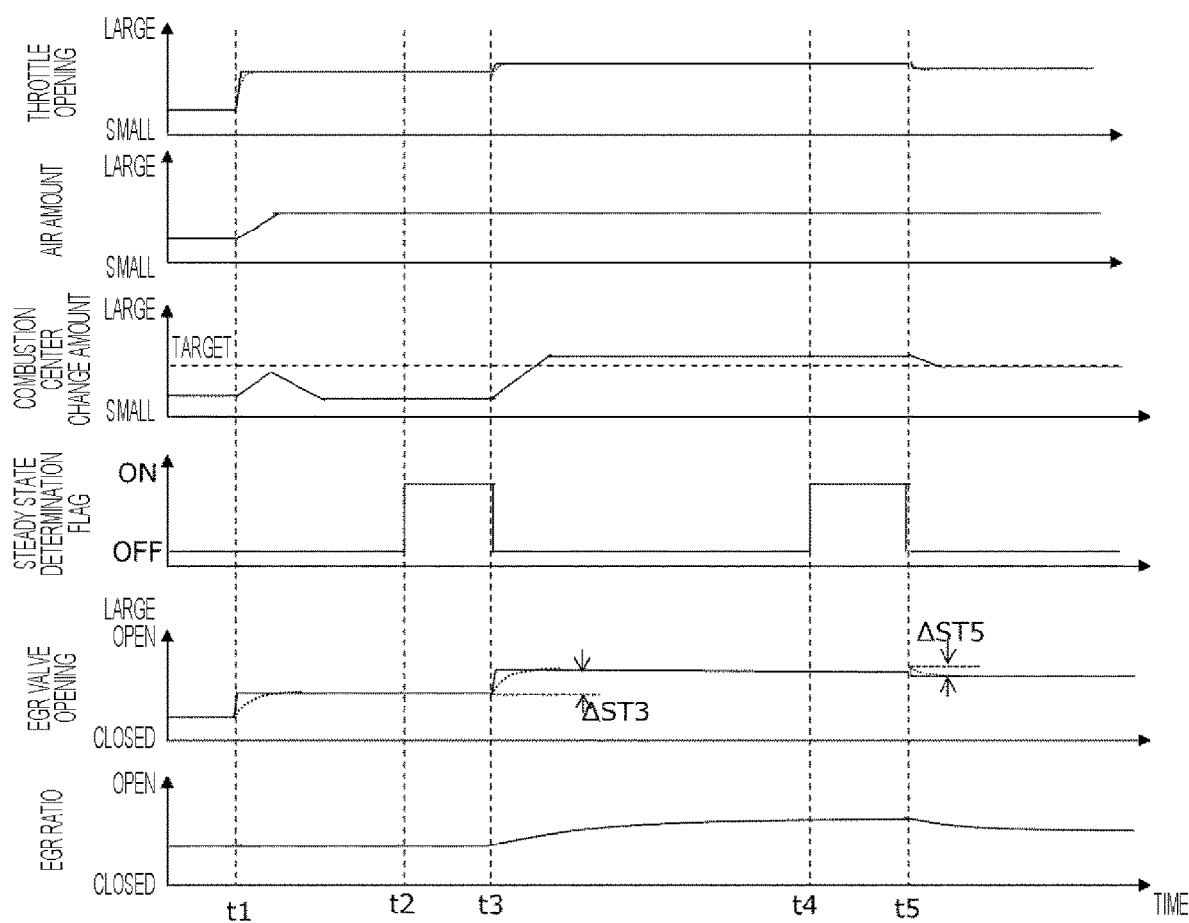
FIG. 5 is a timing chart illustrating a combustion state and states of various actuators when the embodiment of the present invention is executed.

FIG. 5 illustrates an example of a result of the processing described above. A throttle opening, an air amount (detection value), a change amount of the combustion center, a steady state determination flag, an EGR valve opening, and an EGR ratio are illustrated from the top. In FIG. 5, as time passes, various operations such as a change in a throttle opening at time point t1, a steady state determination at time point t2, the start of an EGR increasing operation based on a change amount of the combustion center at time point t3, a steady state determination after the operation at time point t4, and the start of an EGR decreasing operation based on the change amount of the combustion center at time point t5 occur.

Since there are no various changes in the throttle opening, the EGR valve, and the air amount after the change in the throttle opening at time point t1, it is determined that the state is steady at time point t2, and the steady state flag is ON (=1). Here, since the EGR valve is open, it is determined that dilution combustion is being executed, and since the combustion center change amount is less than the target value indicated by the dashed line, the operation for opening the EGR valve and increasing the dilution is started from time point t3.

When the steady state determination is performed again at time point t4, it is determined that the absolute value of the difference between the change amount of the combustion center and the target value exceeds the predetermined range, and the dilution decreases from time point t5. Since the change (ΔST3) in the EGR valve opening at time point t3 and the change (ΔST5) in the EGR valve opening at time point t5 are operated in accordance with the difference between the change amount of the combustion center and the target value, the change (ΔST3) in the EGR valve opening at time point t3 and the change (ΔST5) in the EGR valve opening at time point t5 do not necessarily match each other.

Figure 6:
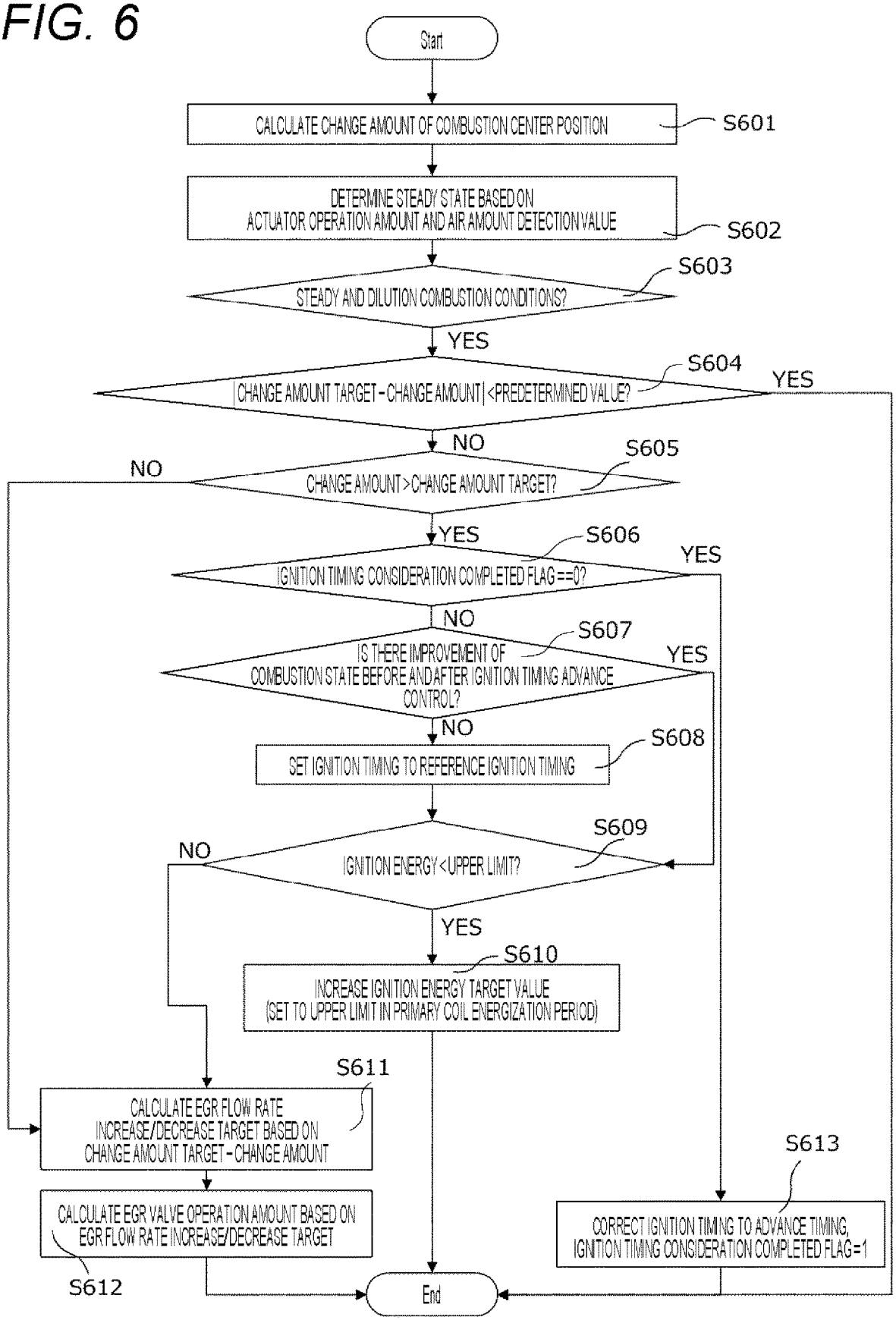
FIG. 6 is a control flowchart for describing a control step executed by the control block according to the embodiment of the present invention.

FIG. 6 illustrates a control flow of a calculation process for controlling a dilution, an ignition timing, and ignition energy in the first embodiment. Step S601 is a process executed by the combustion center change amount calculation unit 32, step S602 is a process executed by the steady state determination unit 31, and steps S603 to S612 are processes executed by the actuator operation amount correction unit 33.

[Step S601]
Step S601 is the same process as step S401 in FIG. 4A.
[Step S602]
Step S602 is the same process as step S402 in FIG. 4A.
[Step S603]
Step S603 is the same process as step S403 in FIG. 4A.
[Step S604]
In step S604, it is determined whether an absolute value of a difference between the change amount of the combustion center position and the change amount target value is less than a predetermined value. The fact that the absolute value of the difference is smaller than the predetermined value indicates that the operation can be performed under a condition close to the allowable change amount. In a case where the absolute value of the difference is equal to or greater than the predetermined value, the process proceeds to step S605. On the other hand, in a case where the absolute value of the difference is smaller than the predetermined value, the flow is ended.

[Step S605]
In step S605, it is determined whether the change amount is larger than the change amount target. Step S605 is a block for determining destabilization and stabilization of the combustion state. In a case where the change amount is larger than the change amount target, the process proceeds to step S606 to control the ignition system. In a case where the change amount is equal to or less than the change amount target, the process proceeds to step S611 and proceeds to control of the dilution.
[Step S606]
In step S606, it is determined whether an ignition timing consideration completed flag is 0. The ignition timing consideration completed flag is a flag indicating whether or not it is evaluated under the current operation conditions whether or not the change amount is reduced by advancing the ignition timing when the change amount of the combustion state is large. The ignition timing consideration completed flag=0 indicates that the ignition timing is advanced and the operation is not performed, and the flag=1 indicates a state in which the ignition timing is advanced and evaluation of whether or not the change amount of the combustion state is changed is completed. The process proceeds to step S607 in a case where the ignition timing consideration completed flag is 1, and the process proceeds to step S613 in a case where the ignition timing consideration completed flag is 0.
[Step S607]
It is determined whether the change amount of the combustion state has decreased by controlling the ignition timing to be advanced. For example, in a case where the change amount of the combustion state is more than a predetermined value before and after the advance of the ignition timing (in a case where the change amount of the combustion state significantly decreases), it is determined that there is improvement, and the process proceeds to step S609. In a case where the change amount of the combustion state is smaller than the predetermined value before and after the advance of the ignition timing, it is determined that there is no improvement, and the process proceeds to step S608.
[Step S608]
In step S608, since there is no change in the combustion state before and after the advance of the ignition timing, it is determined that there is no effect of the ignition timing advance, and the ignition timing is returned to the state before the advance (reference ignition timing). Subsequently, the process proceeds to step S609.
[Step S609]
In step S609, it is determined whether energy that can be generated by the ignition coil has reached an upper limit of an energy amount. This determination is to determine whether the energy that can be generated in the coil can be increased according to the increase in an energization amount of the coil. For example, in a case of a normal coil, it is determined whether a setting of a primary coil energization amount is an upper limit of the primary coil energization amount. The coil energization amount is limited by heat generation of the coil, magnetic saturation of the coil, and the like.

The upper limit of the energization amount of the coil allowed for each operation condition is mapped, and the determination is performed from the map, the current rotation speed, and the throttle opening. As a result, it is possible to determine whether the upper limit of the energy amount that can be generated by the ignition coil has been reached from the upper limit of the energization amount of the coil based on the operation conditions. If a system can assist in a current while the coil is energized, a settable upper limit including the assist amount is determined. In a case where the setting is not the upper limit, the process proceeds to step S610 in order to increase the ignition energy. In a case where the setting has reached the upper limit, the process proceeds to step S611 in order to control the dilution.

[Step S611]

Step S611 is the same process as step S405 in FIG. 4.

[Step S612]

Step S612 is the same process as step S406 in FIG. 4.

[Step S613]

In step S613, the ignition timing is corrected to be advanced by a predetermined value, and the ignition timing consideration completed flag is set to 1. A predetermined value of the ignition advance amount is mapped in advance for each operation condition. For example, the predetermined value may be set in a range of about 2 deg. to 5 deg.

According to the above processing, it is possible to operate a dilution according to a change amount of the combustion state, it is possible to set the dilution based on a dilution range that can be set for each individual, and it is possible to set the optimum dilution on-board. Since the ignition timing and the ignition energy can be operated under the condition that the change amount of the combustion state is large, it is possible to perform coping by using an actuator with fast responsiveness. It is possible to appropriately set the dilution in consideration of the control, and it is possible to improve the efficiency for each individual in consideration of an individual difference.

Figure 7:
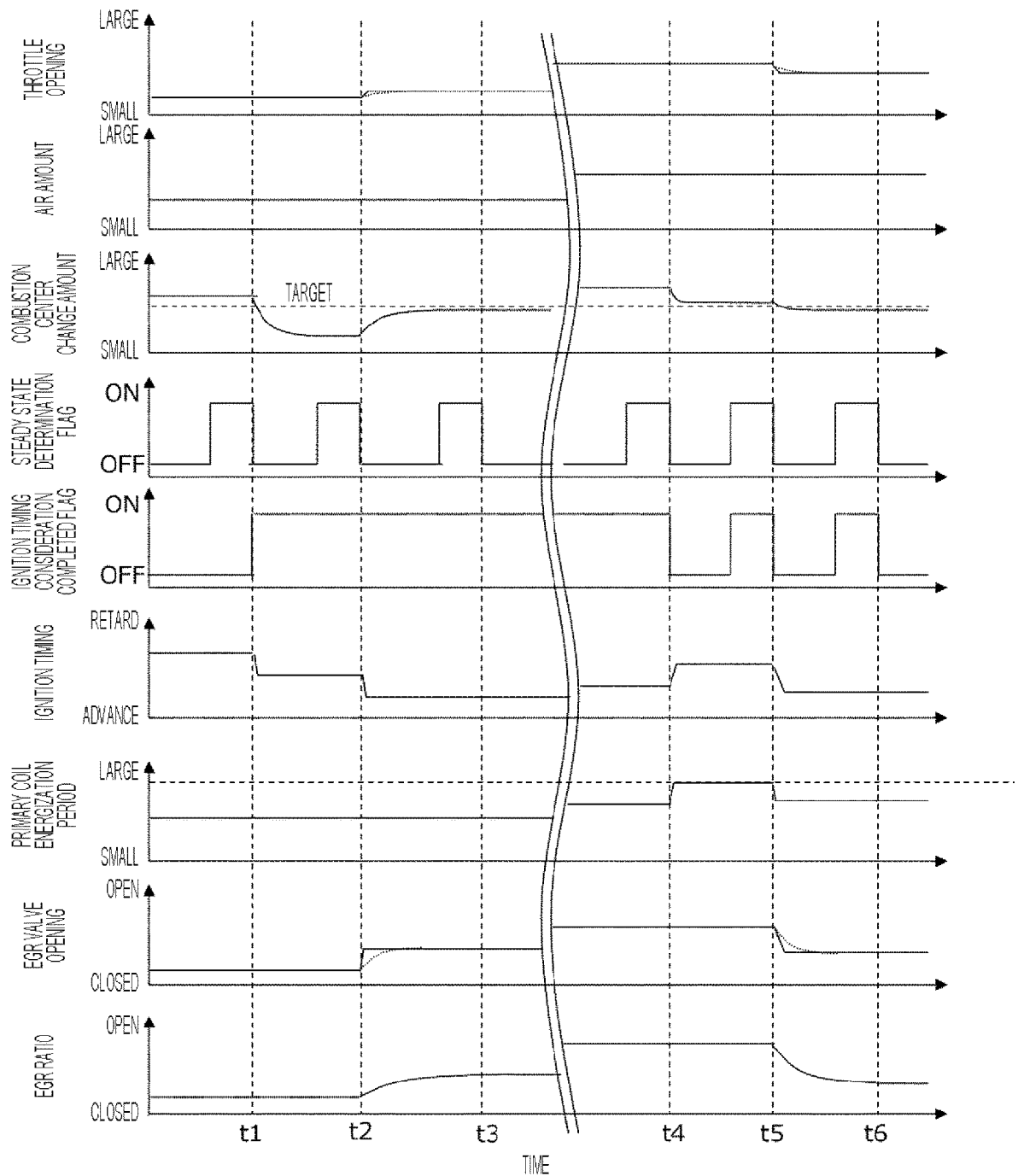
FIG. 7 is a timing chart illustrating a combustion state and states of various actuators when the embodiment of the present invention is executed.

FIG. 7 illustrates an example of a result of the processing described above. A throttle opening, an air amount (detection value), a change amount of the combustion center which is one of combustion states, a steady state determination flag, an EGR valve opening, and an EGR ratio are illustrated from the top. In FIG. 7, as time passes, an ignition advance operation is started at time point t1, and an EGR increase operation is performed based on a change amount of the combustion center at time point t2. It is determined that there is no advance effect of the ignition timing at time point t4, correction of the ignition timing and an operation for increasing the ignition energy (primary coil energization period) are performed, and an EGR decrease operation is performed based on the change amount of the combustion center at time point t5.

Since the change amount of the combustion center position decreases through an operation for the ignition timing starting from time point t1, it is determined that the advance of the ignition timing has an effect. Since a difference between the combustion center change amount and the target value indicated by the dashed line has increased from the decrease in the change amount of the combustion center position due to the advance of the ignition timing, the EGR increase operation based on the difference is started at time point t2. As described above, by performing the operation based on the change amount of the combustion state, there is a possibility that a state of the dilution can be set to a high state and efficiency improvement can be realized.

At time point t4, it is determined that the change amount of the combustion state due to the ignition timing advance is small, and the ignition energy is increased, so that the primary coil energization period starts to increase. Although the change amount of the combustion state decreases due to the increase in the energization period, the change amount does not reach the target value indicated by the dashed line, such that the operation for the dilution starts from time point t5. In this case, the setting of the primary coil energization time is returned to the original setting, but the ignition energy may be maintained without being changed.

Through the above setting, means for reducing the change amount of the combustion state can be implemented in order of earliest responsiveness, and a state in which the change amount of the combustion state is large can be avoided earlier. In a case where the problem cannot be solved only by the ignition system, various operation amounts can be set to an optimum state in consideration of the performance of the ignition system by operating the dilution.

Figure 8:
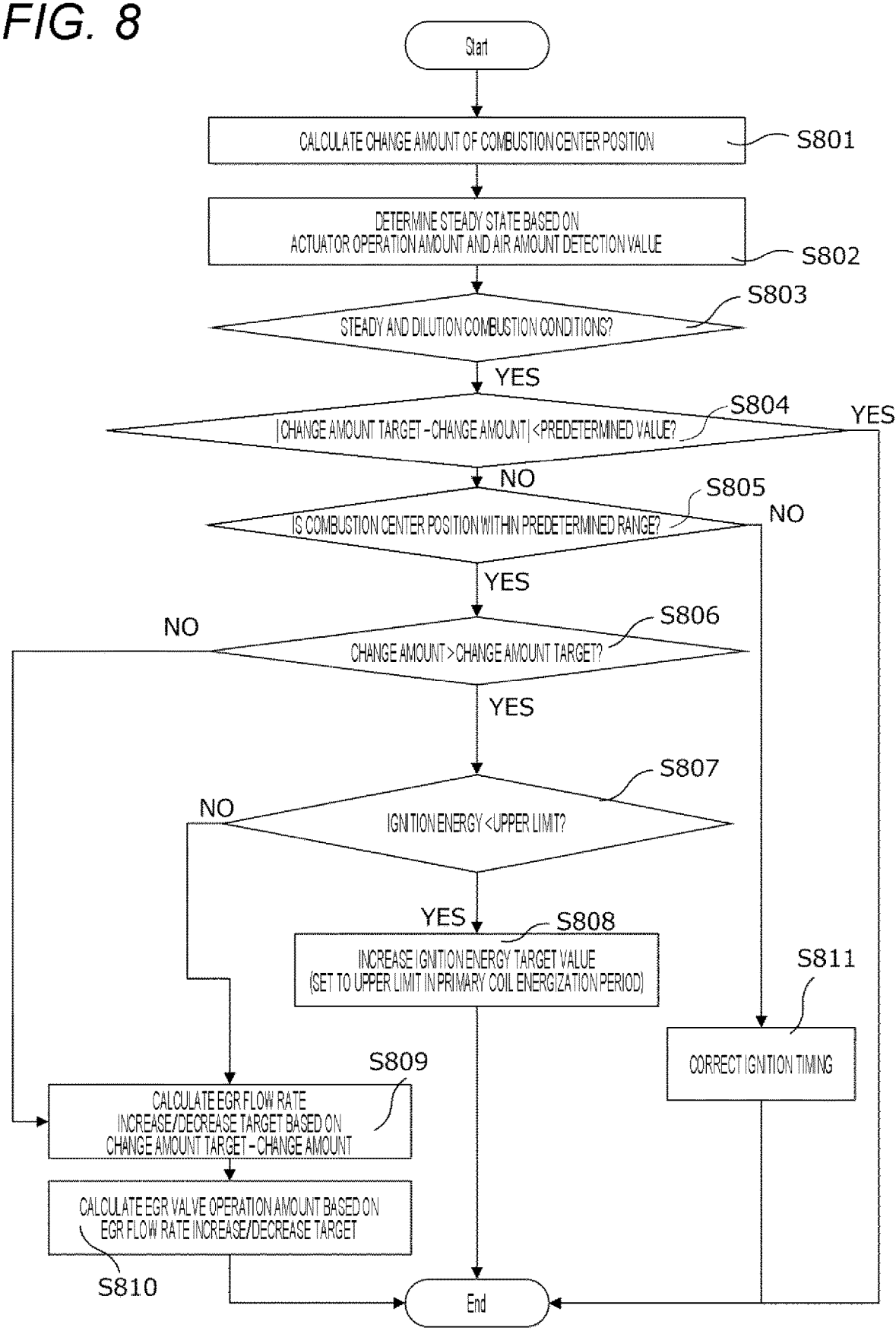
FIG. 8 is a control flowchart for describing a control step executed by the control block according to the embodiment of the present invention.

FIG. 8 is a control flow of a calculation process for controlling a dilution, an ignition timing, and ignition energy in the first embodiment, but a partial determination is performed based on not a change amount of the combustion state but an average value of the combustion state. Step S801 is a process executed by the combustion center change amount calculation unit 32, step S802 is a process executed by the steady state determination unit 31, and steps S803 to S810 are processes executed by the actuator operation amount correction unit 33.

[Step S801]

Step S801 is the same process as step S401 in FIG. 4A.

[Step S802]

Step S802 is the same process as step S402 in FIG. 4A.

[Step S803]

Step S603 is the same process as step S403 in FIG. 4A.

[Step S804]

In step S804, the same determination as in step S604 in FIG. 6 is performed. In a case where an absolute value of a difference between the change amount of the combustion center position and the change amount target value is equal to or greater than the predetermined value, the process proceeds to step S805. On the other hand, in a case where the absolute value of the difference is smaller than the predetermined value, it is determined that the state is optimal, and the flow is ended.

[Step S805]

In step S805, it is determined whether an average value of the combustion center position, which is an average value of the combustion states, is within a predetermined range. It is considered that the combustion center position is required to be located in a range of approximately 10 deg. after the top dead center in order to increase thermal efficiency. For example, the predetermined range may be set to 10 deg. after the top dead center. A setting range (predetermined range) is not limited to this numerical value, and may be appropriately set depending on an engine or a dilution. In a case where the average value of the combustion center positions is within the predetermined range, it is determined that the ignition timing is set to an appropriate state, and the process proceeds to step S806. In a case where the average value of the combustion center positions is out of the predetermined range, the process proceeds to step S811, and the ignition timing is corrected.

[Step S806]

In step S806, the same determination as in step S605 in FIG. 6 is performed. In a case where the change amount is more than the change amount target, the process proceeds to step S807 to control the ignition system. In a case where the change amount is equal to or less than the change amount target, the process proceeds to step S809 and proceeds to control of the dilution.

[Step S807]

In step S807, the same determination as in step S609 in FIG. 6 is performed. In a case where the setting of the ignition energy is not the upper limit, the process proceeds to step S807 in order to increase the ignition energy. In a case where the upper limit has been reached, the process proceeds to step S809 in order to control the dilution.

[Step S808]

Step S808 is the same process as step S610 in FIG. 6.

[Step S809]

Step S809 is the same process as step S405 in FIG. 4.

[Step S810]

Step S810 is the same process as step S406 in FIG. 4.

[Step S811]

Since the combustion center position is in an inappropriate state, step S811 is a process of controlling the combustion center position by using an ignition timing. For example, when the combustion center position comes before the top dead center, the ignition timing is retarded, and when the combustion center position is later than 10 deg. after the top dead center, the ignition timing is advanced. For example, a correction amount of the ignition timing may be determined according to the following equation.

Ignition timing correction amount=average value of combustion center position−target combustion center position A positive value of the ignition timing correction amount means retarding the ignition timing, and a negative value thereof indicates advancing the ignition timing. The target combustion center position may be, for example, 5 deg. The target combustion center position does not have to be a constant value, and may be changed for each engine or for each operation condition. Through the above setting, it is possible to easily operate the appropriate ignition timing based on the combustion state.

According to the above processing, it is possible to operate a dilution according to a change amount of the combustion state, it is possible to set the dilution based on a dilution range that can be set for each individual, and it is possible to set the optimum dilution on-board. The ignition timing can be quantitatively set by operating the ignition timing according to an average value of the combustion center positions under the condition that the change amount of the combustion state is large. Since the ignition energy can be operated, it is possible to perform coping using an actuator with fast responsiveness. It is possible to appropriately set the dilution in consideration of the control, and it is possible to improve the efficiency for each individual in consideration of an individual difference.

Figure 9:
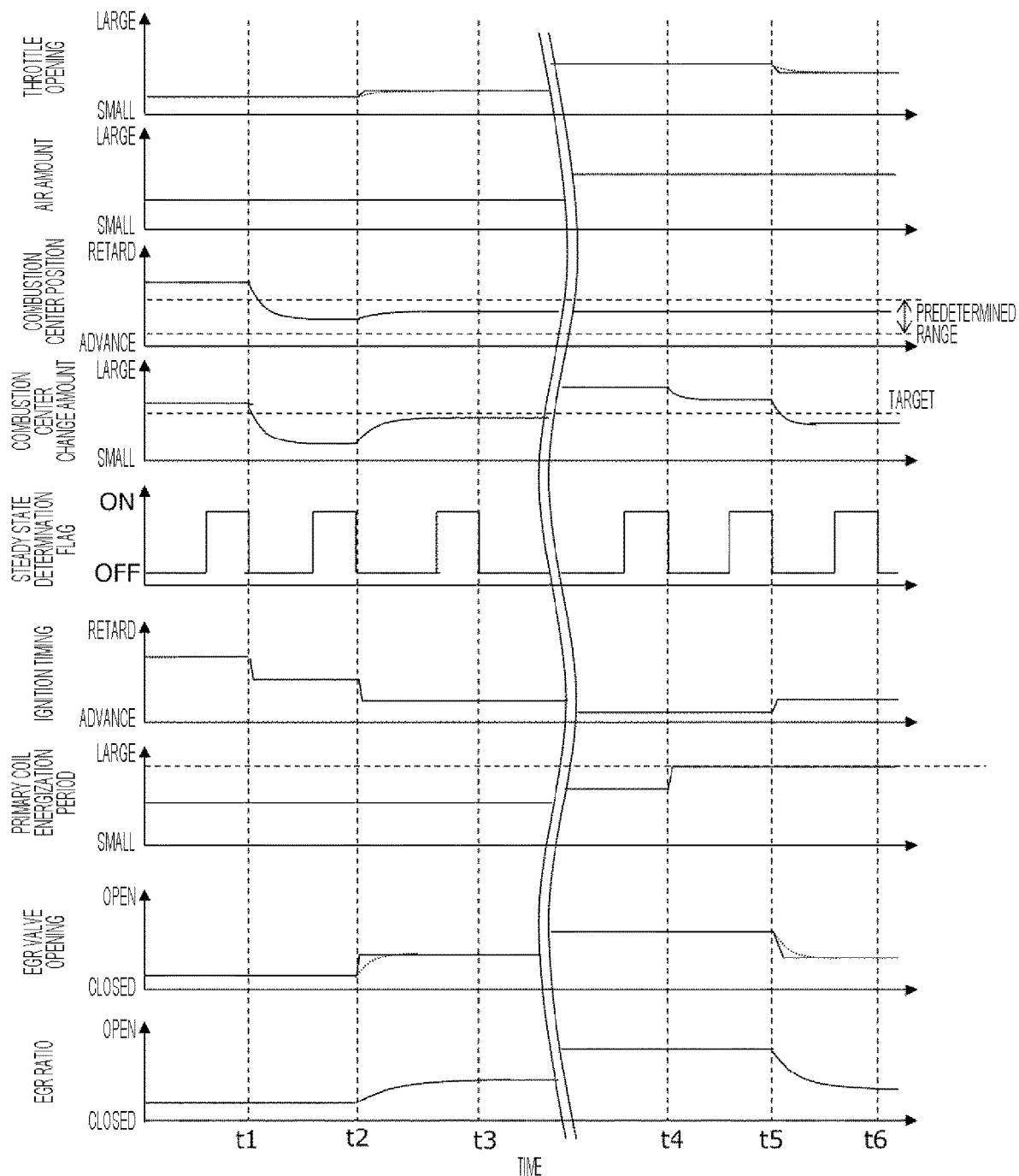
FIG. 9 is a timing chart illustrating a combustion state and states of various actuators when the embodiment of the present invention is executed.

FIG. 9 illustrates an example of a result of the processing described above. A throttle opening, an air amount (detection value), a combustion center position which is one of combustion states, a change amount of the combustion center which is one of combustion states, a steady state determination flag, an EGR valve opening, and an EGR ratio are illustrated from the top. In FIG. 9, as time passes, the ignition advance operation is started at time point t1, and an EGR increase operation is performed based on a change amount of the combustion center at time point t2. At time point t4, although the combustion center position is in a predetermined range surrounded by a dashed line, since the change amount of the combustion center is more than the target value, the ignition energy starts to increase (prolongation of the energization time of the primary coil). At time point t5, an EGR decrease operation is performed based on the change amount of the combustion center.

The combustion center position is within a predetermined value by performing the operation for the ignition timing starting from time point t1. Since the change amount of the combustion center position decreases and the difference between the combustion center change amount and the target value indicated by the dashed line increases, the EGR increase operation based on the difference starts at time point t2. As described above, by performing the operation based on the change amount of the combustion state, there is a possibility that a state of the dilution can be set to a high state and efficiency improvement can be realized even after a stable state is obtained as a result of setting the ignition timing to an appropriate state.

At time point t4, the combustion center position is within the predetermined range, but since the change amount of the combustion state is more than the predetermined value, the ignition energy increases, so that the primary coil energization period starts to increase. A change amount of the combustion state due to the energization of the ignition coil caused by the increase in the energization period decreases, but does not reach the target value indicated by the dashed line, and thus the operation for the dilution starts from time point t5. In this case, the setting of the primary coil energization time is not changed, and the ignition energy is maintained.

Through the above setting, the ignition timing can be set to an appropriate state based on a more quantitative index, the ignition energy and the dilution can be operated based on the change amount of the combustion state, appropriate means can be quickly selected, and it is possible to quickly execute a transition to a highly efficient state.

Figure 10:
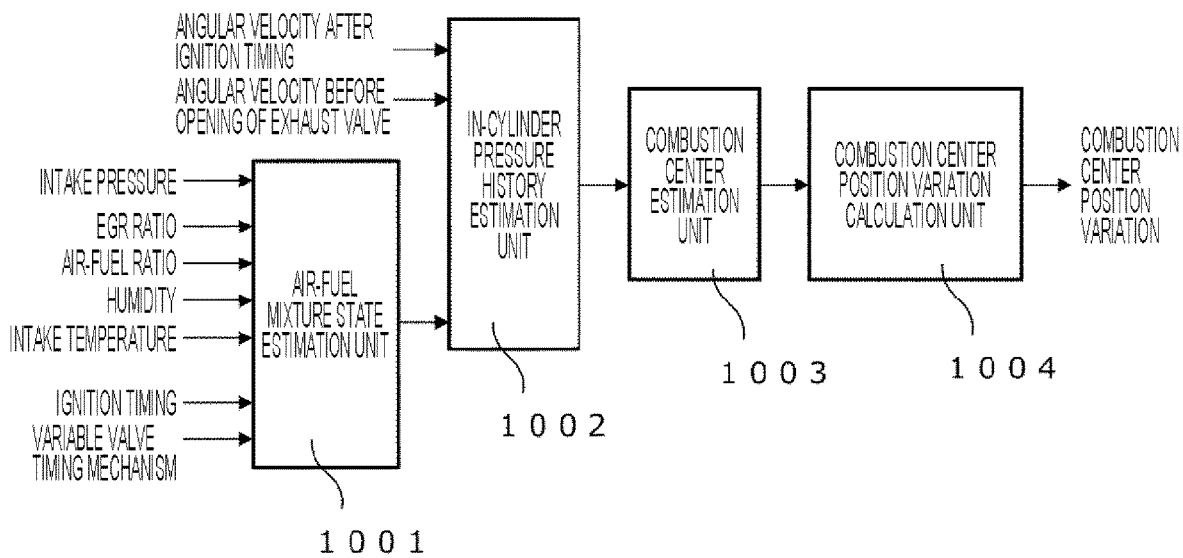
FIG. 10 is a control block diagram according to an embodiment of the present invention.

FIG. 10 illustrates blocks for executing processing in the combustion center change amount calculation unit 32 in FIG. 3. An air-fuel mixture state estimation unit 1001 estimates a state of an air-fuel mixture based on various inputs such as an intake pressure, an EGR ratio, an air-fuel ratio, humidity, an intake temperature, and a variable valve timing mechanism (variable valve 5). An in-cylinder pressure history estimation unit 1002 estimates a history of in-cylinder pressures or an in-cylinder pressure at a plurality of crank angles based on the result estimated by the air-fuel mixture state estimation unit and information regarding an angular velocity at a crank angle.

A combustion center estimation unit 1003 estimates the combustion center position based on the in-cylinder pressure information estimated by the in-cylinder pressure history estimation unit and a combustion model equation. A combustion center position variation calculation unit 1004 calculates a change amount of the combustion center position based on estimated values of the combustion center positions in a plurality of cycles. The change amount of the combustion state described above means a change amount of the combustion center position.

Figure 11:
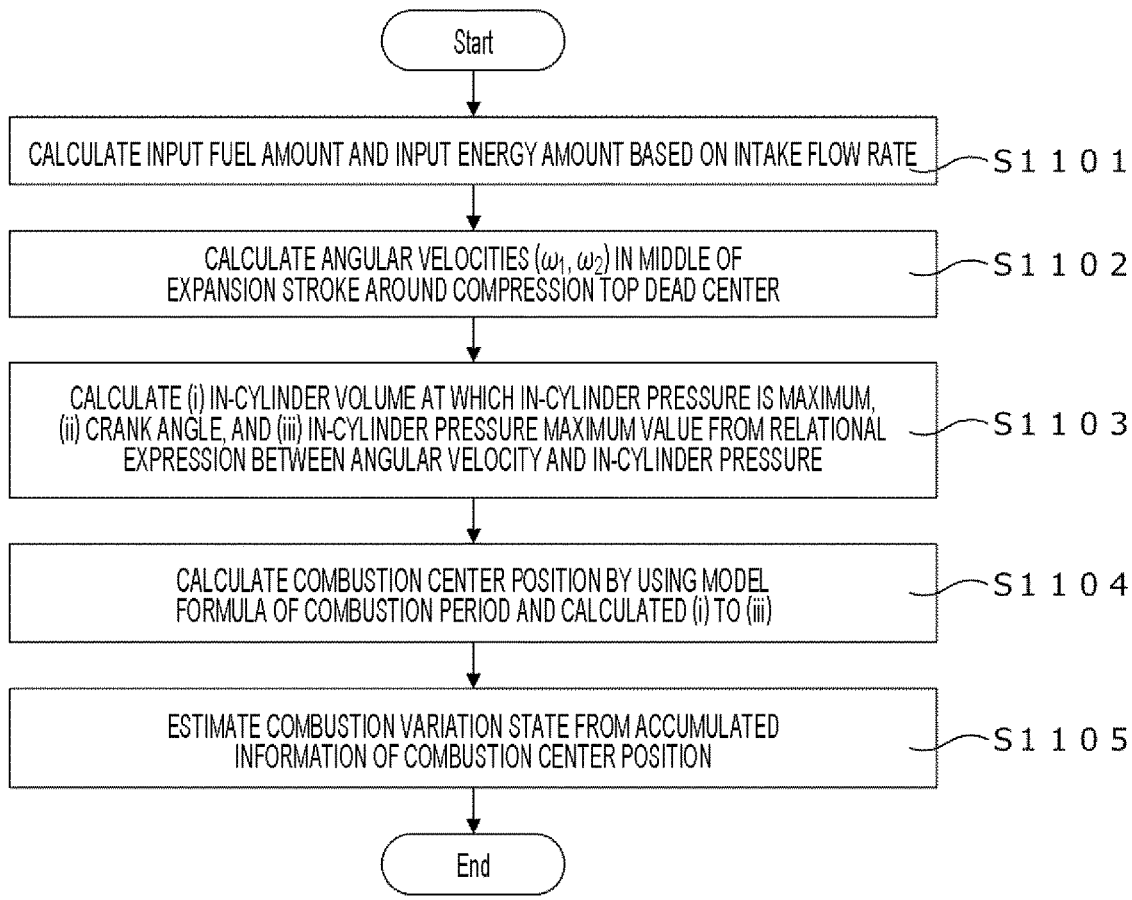
FIG. 11 is a control flowchart for describing a control step executed by the control block according to the embodiment of the present invention.

FIG. 11 is a flowchart illustrating processing executed in each block in FIG. 10. Step S1101 is executed by the air-fuel mixture state estimation unit, steps S1102 and S1103 are executed by the in-cylinder pressure history estimation unit 1002, step S1104 is executed by the combustion center estimation unit 1003, and step S1105 is executed by the combustion center position variation calculation unit 1004.

[Step S1101]

In step S1101, an amount of fuel (an amount of input energy) input in a state of the air-fuel mixture is estimated from information such as the intake pressure by using the following equation.

[Math. 1]

$$Q_{R,inp} = \frac{p_{int}\{V(\theta_{IVC}) - V(\theta_{TDC})\}}{RT_{int}\left(1 + \frac{1}{AFR} + \frac{r_{EGR}}{1 - r_{EGR}}\right)} \frac{1}{AFR} H_L \qquad (1)$$

Here, $Q_{R,inp[\ ]}$ [J] is an input energy amount, Pint [Pa] is an intake pressure, $V(\theta_{IVC})$ [m³] is a volume [m³] at an intake valve closing timing, $V(\theta_{TDC})$ is a volume [m³] at the top dead center, R is a gas constant [J/kg/K], $T_{int}$ is an intake temperature [K], AFR is an air-fuel ratio [–], $r_{EGR}$ is an EGR ratio [–], and $H_L$ is a low calorific value [J] of the fuel.

[Step S1103]

In step S1103, a crank angle ((ii) that will be described later) and an in-cylinder pressure maximum value ((iii) that will be described later) are calculated from a relational expression between the angular velocity and the in-cylinder pressure.

(i). In-Cylinder Volume $V(\theta_{pmax})$ at which In-Cylinder Pressure is Maximum

[Math. 2]

$$\frac{\omega(\theta_2) - \omega(\theta_1)}{t(\theta_2) - t(\theta_1)} = \frac{p(\theta_1)V(\theta_1)}{1-\gamma}\left\{\left(\frac{V(\theta_{TDC})}{V(\theta_1)}\right)^{1-\gamma} - 1\right\} \quad (2)$$
$$+ p(\theta_{ADV})\left(\frac{V(\theta_{ADV})}{V(\theta_{TDC})}\right)^{\gamma}\{V(\theta_M) - V(\theta_{TDC})\}$$
$$+ \left\{p(\theta_2)\left(\frac{V(\theta_2)}{V(\theta_{TDC})}\right)^{\gamma_b}\right.$$
$$- p(\theta_{ADV})\left(\frac{V(\theta_{ADV})}{V(\theta_{TDC})}\right)^{\gamma}\left\}\left(\frac{V(\theta_{pmax}) - V(\theta_{TDC})}{C_{pmax}}\right)$$
$$+ \frac{p(\theta_2)V(\theta_2)}{1-\gamma_b}\left\{1 - \left(\frac{V(\theta_{pmax})}{V(\theta_2)}\right)^{1-\gamma_b}\right\} - p_{atm}\{V(\theta_2) - V(\theta_1)\}$$

Here, $\omega(\theta_k)$ is an angular velocity [rad/s], $t(\theta_k)$ is a time [s] at the crank angle $\theta_k$, $p(\theta_k)$ is an in-cylinder pressure [Pa] at the crank angle $\theta_k$, $p_{atm}$ is the atmospheric pressure [Pa], $\gamma$ is a specific heat ratio [–] of an unburned gas, and $\gamma_b$ is a specific heat ratio [–] of a burned gas. The specific heat ratio of the unburned gas and the specific heat ratio of the burned gas change depending on a state of the gas, but may be set to a value of about 1.2 to 1.4. $p(\theta_k)$ may be estimated by using an estimation equation. For example, there is the following estimation equation.

[Math. 3]

$$p(\theta_1) = C_{int}p_{int}\left(\frac{V(\theta_{IVC})}{V(\theta_1)}\right)^{\gamma} \quad (2.1)$$

[Math. 4]

$$p(\theta_2) = \frac{p(\theta_{ADV})V(\theta_{ADV}) + \eta_E Q_{R,inp}}{V(\theta_2)} \quad (2.2)$$

Here, Cint is a model constant, and $\eta E$ is a ratio [–] of exhaust heat to input energy. These values can be determined in advance through an engine test or simulation.

(ii). Crank Angle at which In-Cylinder Pressure is Maximum

[Math. 5]

$$V(\theta) = V_{cc} + \frac{\pi D^2}{4}r\left\{(1-\cos\theta) + \frac{1}{\lambda}(1-\cos2\theta)\right\} \quad (3)$$

The in-cylinder volume $V(\theta_{pmax})$ at which the in-cylinder pressure is the maximum in (i) is substituted into $V(\theta)$, and the nonlinear equation is solved to calculate $\theta_{pmax}$.

(iii). In-Cylinder Pressure Maximum Value

[Math. 6]

$$p_{max} = p(\theta_2)\left(\frac{V(\theta_2)}{V(\theta_{pmax})}\right)^{\gamma_b} \quad (4)$$

The in-cylinder volume $V(\theta_{pmax})$ at which the in-cylinder pressure is the maximum in (i) is substituted into $V(\theta)$ to calculate $p_{max}$.

[Step S1104]

The combustion center position is calculated by using (i) to (iii) calculated in step S1103.

(iv). Formula of Combustion Ratio at Maximum Pressure

[Math. 7]

$$MFB(\theta_{pmax}) = \frac{1}{\eta_{IE}(\gamma-1)Q_{R,inp}}[p_{max}V(\theta_{pmax}) - p(\theta_{ADV})V(\theta_{ADV})] + \quad (5)$$
$$\frac{1}{\eta_{IE}Q_{R,inp}}\left[\frac{p(\theta_{ADV})V(\theta_{ADV})}{1-\gamma}\left\{\left(\frac{V_{TDC}}{V(\theta_{ADV})}\right)^{1-\gamma} - 1\right\} + \right.$$
$$p(\theta_{ADV})\left(\frac{V(\theta_{ADV})}{V(\theta_{TDC})}\right)^{\gamma}\{V(\theta_M) - V(\theta_{TDC})\} +$$
$$\left.\left\{p_{max} - p(\theta_{ADV})\left(\frac{V(\theta_{ADV})}{V(\theta_{TDC})}\right)^{\gamma}\right\}\left(\frac{V(\theta_{pmax}) - V(\theta_{TDC})}{C_{pmax}}\right)\right]$$

Here, $\eta IE$ is a ratio [–] between output for input energy and exhaust heat, and Cpmax is a model constant [–]. These values can be determined in advance through an engine test or simulation.

The combustion ratio at the maximum pressure is calculated by substituting (i) to (iii) calculated in step S1103.

(v). Formula of Combustion Period Based on Combustion Ratio at Maximum Pressure

[Math. 8]

$$\Delta\theta_{CD} = (\theta_{pmax} - \theta_{ADV})\left(\frac{-a}{\ln(1-MFB(\theta_{pmax}))}\right)^{\frac{1}{m+1}} \quad (6)$$

Here, a and m are model constants. These values can be determined in advance through an engine test or simulation.

The combustion ratio calculated in (iv) and the crank angle calculated in (ii) are substituted to calculate the combustion period.

(vi). Formula of Center Position

[Math. 9]

$$\theta_{MFB50} = \theta_{ADV} + \Delta\theta_{CD}\left(\frac{-a}{\ln(1-0.5)}\right)^{\frac{-1}{m+1}} \quad (7)$$

The combustion period calculated in (v) is substituted to calculate the combustion center position.

[Step S1105]

The change amount of the combustion state is calculated from accumulated information of the combustion center position. As the change amount of the combustion state, for example, a standard deviation of the combustion center position may be used. The standard deviation has a strong correlation with a standard deviation or a change amount of the engine torque, and is suitable as an index of the change amount of the combustion state.

By calculating the combustion center position as described above, the combustion center position and the change amount thereof can be calculated with high accuracy without using an in-cylinder pressure sensor or a detection device equivalent thereto. In summary, the angular velocity is detected based on the crank angle sensor at two points before and after the ignition timing and after the top dead center. Since combustion occurs between the two conditions, the crank angular velocity greatly changes, and a change due to combustion is included as information, it is appropriate to use the crank angular velocity under the two conditions.

Main features of the present embodiment may also be summarized as follows.

A processor (CPU 23*a*, FIG. 2) of a control device for an internal combustion engine calculates a change amount of a parameter (for example, a combustion center position) indicating a combustion state of the internal combustion engine (combustion center change amount calculation unit 32, FIG. 3). The processor (CPU 23*a*) corrects an operation amount of the actuator (for example, the EGR valve) that adjusts a dilution of an air-fuel mixture according to a difference between the change amount of the parameter indicating a combustion state and a target value of the change amount, and brings the change amount close to the target value (actuator operation amount correcting unit 33, FIG. 3).

As a result, the dilution is adjusted, and the change amount (a variation in the combustion state) of the parameter (for example, the combustion center position) indicating the combustion state approaches the target value (an upper limit value of the variation in the combustion state). Therefore, an operation of the internal combustion engine can be realized in a state in which the dilution is close to the limit. As a result, the fuel consumption of the internal combustion engine can be reduced.

The actuator is, for example, an EGR valve. In a case where the change amount of the parameter (for example, the combustion center position) indicating the combustion state is less than the target value, the processor (CPU 23*a*) increases an opening of the EGR valve as a difference between the change amount and the target value increases (time point t3, FIG. 5). On the other hand, in a case where the change amount of the parameter indicating the combustion state is more than the target value, the opening of the EGR valve is decreased as the difference between the change amount and the target value increases (time point t5, FIG. 5).

As a result, the opening of the EGR valve can be adjusted, and the change amount of the parameter indicating the combustion state can be brought close to the target value.

Although the EGR of the present embodiment is external EGR, the EGR may be internal EGR that returns an exhaust gas to a combustion chamber by delaying a timing of closing the exhaust valve with a variable valve timing mechanism (variable valve 5). In this case, the actuator that adjusts the dilution of the air-fuel mixture is a variable valve timing mechanism, but it can also be said that the exhaust valve also functions as the EGR valve.

In a case where the change amount of the parameter indicating the combustion state is more than the target value, the processor (CPU 23*a*) advances the ignition timing (time point t1, FIG. 7). As a result, the change amount of the parameter indicating the combustion state can be reduced more quickly and brought close to the target value.

In a case where the change amount does not decrease after the ignition timing is advanced, the processor (CPU 23*a*) increases the discharge energy generated in the ignition device (time point t4, FIG. 7). As a result, the combustion state is stabilized, and the change amount of the parameter indicating the combustion state can be reduced. Since the discharge energy is increased only in a case where there is no effect of advancement, wear of the electrode of the spark plug can be suppressed.

The parameter indicating the combustion state is, for example, an average value of the combustion center positions. In a case where the average value of the combustion center positions is out of a predetermined range, the processor (CPU 23*a*) advances the ignition timing (time point t1, FIG. 9). As a result, the ignition timing can be advanced according to the average value of the combustion center positions.

In a case where the average value of the combustion center positions is within the predetermined range and the change amount of the parameter indicating the combustion state is more than the target value, the processor increases discharge energy generated in the ignition device (time point t4, FIG. 9). As a result, the ignition timing can be advanced according to the average value of the combustion center position and the change amount of the parameter indicating the combustion state.

In the present embodiment, the parameter indicating the combustion state is a crank angle (combustion center position) at which a combustion ratio of the air-fuel mixture is a predetermined value (0.5), but may be an index correlated with the combustion ratio of the air-fuel mixture, a maximum value of the in-cylinder pressure, or a crank angle at which the in-cylinder pressure is the maximum. As a result, an operation of the internal combustion engine can be realized in a state in which the dilution is close to a limit value.

Specifically, the parameter indicating the combustion state is the combustion center position. The processor (CPU 23*a*) estimates an in-cylinder pressure of the internal combustion engine based on the crank angular velocity ($\omega 1$) at a first timing after the ignition timing and the crank angular velocity ($\omega 2$) at a second timing before the exhaust valve is opened, and estimates the combustion center position by using the estimated in-cylinder pressure (FIG. 11). Consequently, it is possible to estimate the combustion center position without using an in-cylinder sensor (pressure sensor). Since the in-cylinder sensor is not used, the manufacturing cost can be reduced.

Figure 13:
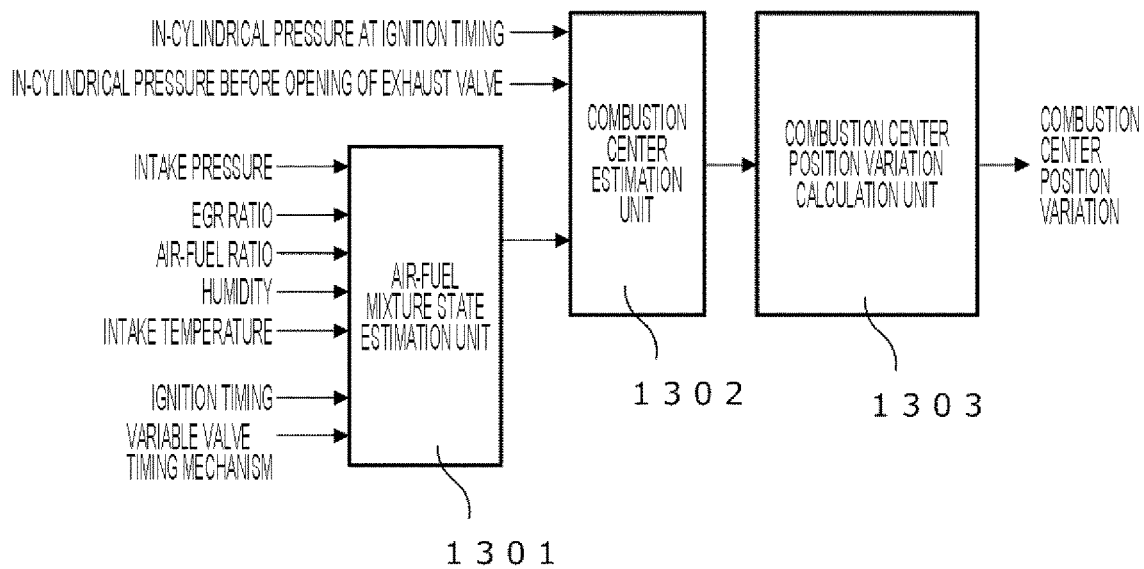
FIG. 13 is a control block diagram according to the second embodiment of the present invention.

As will be described in a second embodiment, the combustion center position may be estimated by using the in-cylinder pressure detected by the sensor (FIG. 13). As a result, for example, the load on the processor can be reduced.

In the present embodiment, when an intake system state is a steady state, the processor (CPU 23*a*) corrects the operation amount of the actuator (FIG. 4A), but may correct the operation amount when a traveling state is a constant speed state or the traveling state is a constant acceleration state. As a result, the operation amount of the actuator can be corrected in a state in which the operation amount (correction target) of the actuator does not vary as much as possible.

In the present embodiment, the standard deviation is used as the change amount, but the change amount may be a deviation indicating a difference from a reference value. The reference value may be a value of a parameter (for example, the combustion center position) indicating a combustion state in a previous combustion cycle instead of the average value. That is, the change amount may be a cycle change amount indicating a change amount in each combustion cycle. As a result, the dilution is adjusted for each combustion cycle, and the change amount of the parameter indicating the combustion state (a variation in the combustion state) approaches the target value (an upper limit value of a variation in the combustion state). Therefore, an operation of the internal combustion engine can be realized in a state in which the dilution is close to the limit.

Second Embodiment

Figure 12:
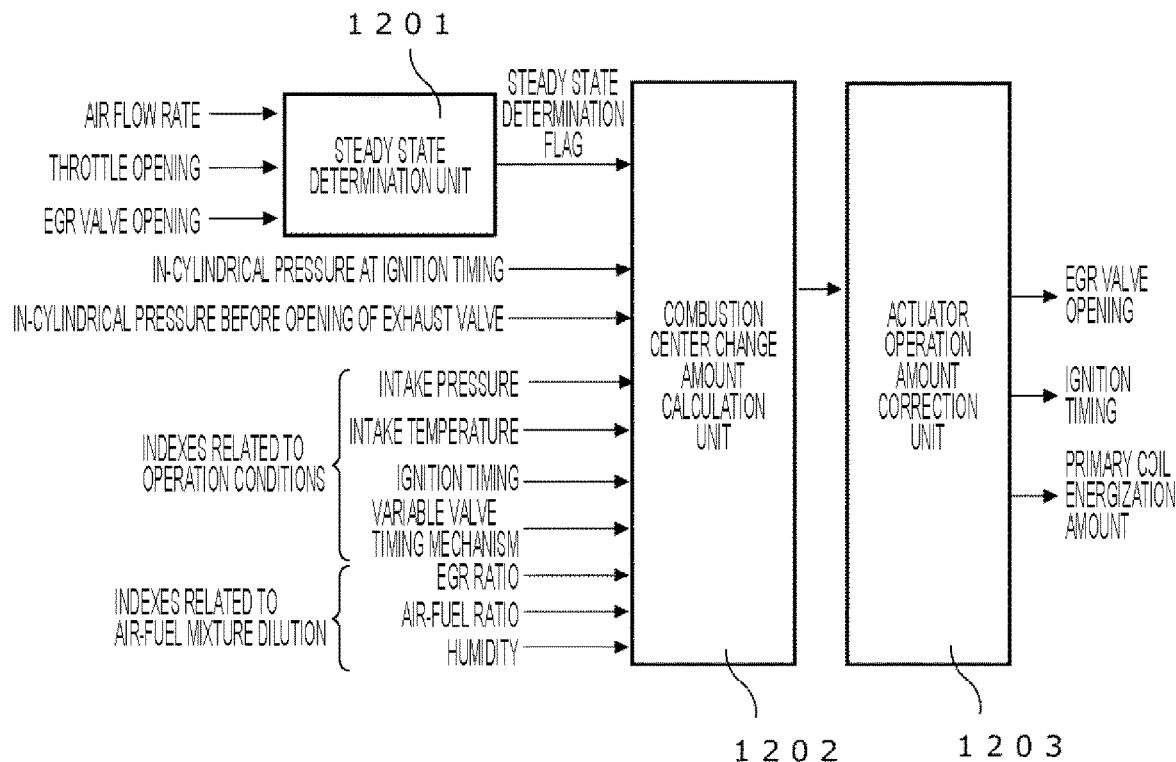
FIG. 12 is a control block diagram according to a second embodiment of the present invention.

FIG. 12 is a control block illustrating an outline of discharge energy control performed by an ignition control unit 24 and an EGR ratio control unit 25 in an ECU 20 which is a control device for an internal combustion engine according to an embodiment of the present invention, and is a second embodiment. A difference from the embodiment in FIG. 3 is that a detection value of an in-cylinder pressure is used to calculate a combustion center change amount. The steady state determining unit and the actuator operation amount correcting unit in FIGS. 3 and 12 are the same. A difference is that a part of the input of the combustion center change amount calculation unit is changed from a value of the crank angle sensor to an in-cylinder pressure.

FIG. 13 illustrates a block configuration of a combustion center change amount calculation unit 1202 according to the second embodiment of the present invention. An air-fuel mixture state estimation unit 1301 is the same as the air-fuel mixture state estimation unit 1001 in FIG. 10. A combustion center position variation calculation unit 1303 is the same as the combustion center position variation calculation unit 1004 in FIG. 10. A difference from FIG. 3 is that there is no in-cylinder pressure history estimation unit since a detection value of the in-cylinder pressure can be input, and processing of the combustion center estimation unit is different since the detection value of the in-cylinder pressure is input.

Figure 14:
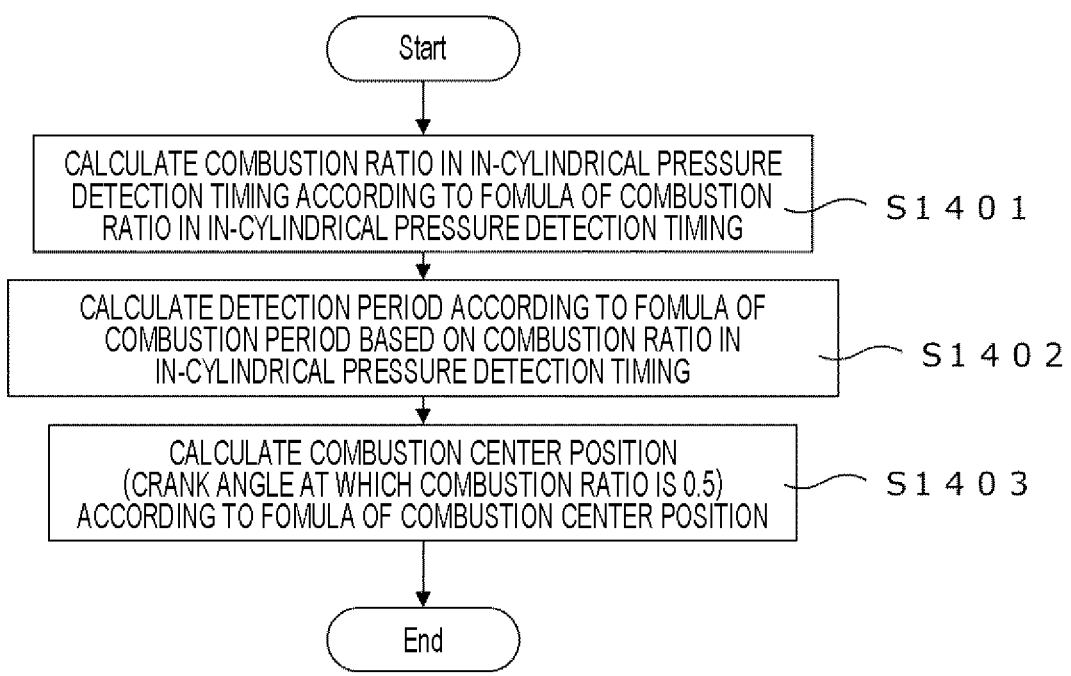
FIG. 14 is a control flowchart for describing a control step executed by the control block according to the second embodiment of the present invention.

Processing of the combustion center estimation unit 1302 in the second embodiment will be described with reference to FIG. 14.

[Step S1401]
(vii). Formula of Combustion Ratio at In-Cylinder Pressure Detection Timing $\theta_M$

[Math. 10]

$$MFB(\theta_M) = \frac{1}{\eta_{IE}(\gamma-1)Q_{R.inp}}[p(\theta_M)V(\theta_M) - p(\theta_{ADV})V(\theta_{ADV})] + \frac{1}{\eta_{IE}Q_{R.inp}} \left[\frac{p(\theta_{ADV})V(\theta_{ADV})}{1-\gamma}\left\{\left(\frac{V(\theta_{TDC})}{V(\theta_{ADV})}\right)^{1-\gamma} - 1\right\} + p(\theta_m)\{V(\theta_M) - V(\theta_{TDC})\}\right] \tag{8}$$

An in-cylinder pressure before opening of the exhaust valve and an in-cylinder pressure at an ignition timing are input, and a combustion ratio at an in-cylinder pressure detection timing is calculated.

[Step S1402]
(viii). Formula of Combustion Period Based on Combustion Ratio of In-Cylinder Pressure Detection Timing

[Math. 11]

$$\Delta\theta_{CD} = (\theta_M - \theta_{ADV})\left(\frac{-a}{\ln(1 - MFB(\theta_M))}\right)^{\frac{1}{m+1}} \tag{9}$$

The combustion ratio at the in-cylinder pressure detection timing calculated in (vii) is substituted to calculate a combustion period.

[Step S1403]
(ix). Formula of Combustion Center Position

[Math. 12]

$$\theta = \theta_{ADV} + \Delta\theta_{CD}\left(\frac{-a}{\ln(1 - MFB(\theta_M))}\right)^{\frac{-1}{m+1}} \tag{10}$$

The combustion period calculated in (viii) is substituted to calculate a combustion center position.

By calculating the combustion center position as described above, the combustion center position and the change amount thereof can be calculated with high accuracy with less information when the in-cylinder pressure sensor or a detection device equivalent thereto is used. In summary, the in-cylinder pressure is detected at two points before and after the ignition timing and after the top dead center. The points after the top dead center have a combustion progress state at a predetermined timing, and it is appropriate to select a state in the middle of combustion as much as possible. The in-cylinder pressure may be detected by using an in-cylinder pressure sensor, or may be indirectly detected from information regarding an index (for example, a secondary voltage of the ignition coil) correlated with the in-cylinder pressure.

Note that the present invention is not limited to the above-described embodiments, and includes various modification examples. For example, the above-described embodiments have been described in detail for easy understanding of the present invention, and are not necessarily limited to those having all the described configurations. A part of the configuration of one embodiment can be replaced with the configuration of another embodiment, and the configuration of another embodiment can be added to the configuration of one embodiment. It is possible to add, delete, and replace other configurations for a part of the configuration of each embodiment.

Some or all of the above-described configurations, functions, and the like may be realized by hardware, for example, by designing the configurations with an integrated circuit. Each of the above-described configurations, functions, and the like may be realized by software by a processor (microcomputer) interpreting and executing a program for realizing each function. Information such as a program, a table, and a file for realizing each function may be stored in a recording device such as a memory, a hard disk, and a solid state drive (SSD), or a recording medium such as an IC card, an SD card, and a DVD.

Embodiments of the present invention may have the following aspects.

(1). A control device for an internal combustion engine, including: a combustion state estimation unit that estimates a combustion state in the internal combustion engine; and an operation amount correction unit that operates a dilution based on a change amount of the combustion state.

(2). The control device according to (1), in which the combustion state is an index having a correlation with a combustion ratio of an air-fuel mixture in an engine.

(3). The control device according to (1) or (2), in which the combustion state is a crank angle at which a combustion ratio of an air-fuel mixture in an engine is a predetermined value.

(4). The control device according to (1) or (2), in which the combustion state is a maximum value of an in-cylinder pressure or a crank angle at which the in-cylinder pressure is maximum.

(5). (Estimation of combustion state based on two crank angle sensor inputs)

The control device according to any one of (1) to (4), in which the combustion state estimation unit is a combustion state estimation unit that estimates the combustion state based on a crank angle sensor signal, and includes the estimation unit including an in-cylinder pressure history estimation unit that estimates an in-cylinder history of the internal combustion engine based on a crank angular velocity at a predetermined timing after an ignition timing and a crank angular velocity at a predetermined timing before an exhaust valve is opened, and a combustion center estimation unit that estimates the combustion state based on the estimated in-cylinder pressure history.

(6). (Estimation of combustion state based on two in-cylinder pressure detection values or estimated values)

The control device according to any one of (1) to (4), in which the combustion state estimation unit is a combustion state estimation unit that estimates the combustion state based on an estimated value or a detection value of an in-cylinder pressure, and the control device includes the estimation unit including: an in-cylinder pressure history estimation unit that estimates an in-cylinder history of the internal combustion engine based on an estimated value or a detection value of the in-cylinder pressure at a predetermined timing after an ignition timing and an estimated value or a detection value of the in-cylinder pressure at a predetermined timing before an exhaust valve is opened; and a combustion center estimation unit that estimates the combustion state based on the estimated in-cylinder pressure history.

(7). (Embodying that dilution operation is proportional to difference between variation target and variation amount)

The control device according to any one of (1) to (6), in which the operation amount correction unit has a positive correlation with a difference between the change amount of the combustion state and a target value of the change amount of the combustion state, and an operation amount of the dilution.

(8). (Embodying coping with combustion instability by increasing ignition energy at time of combustion instability)

The control device according to any one of (1) to (7), in which the operation amount correction unit includes means for being operated to increase discharge energy generated by an ignition device provided in the internal combustion engine in a case where the change amount of the combustion state is more than an allowable upper limit value of the change amount of the combustion state.

(9). The control device according to any one of (1) to (8), in which the operation amount correction unit advances a timing at which discharge energy is generated by an ignition device provided in the internal combustion engine in a case where the change amount of the combustion state is more than an allowable upper limit value of the change amount of the combustion state.

(10). The control device according to any one of (1) to (8), in which the operation amount correction unit operates a timing at which discharge energy is generated by an ignition device provided in the internal combustion engine in a case where an average value of the combustion state does not fall within a predetermined range.

(11). The control device for the internal combustion engine according to any one of (1) to (9), including a steady state determination unit that determines whether an intake system state is a steady state, in which operations of various actuators are performed when the steady state determination unit determines that the intake system state is the steady state.

(12). The control device for the internal combustion engine according to any one of (1) to (9), including a traveling state determination unit that determines whether a traveling state is a constant speed state, in which operations of various actuators are performed when it is determined that the traveling state is the constant state.

(13). The control device for the internal combustion engine according to any one of (1) to (9), including a traveling state determination unit that determines whether a traveling state is in a constant acceleration state, in which operations of various actuators are performed when it is determined that the state is the constant acceleration state.

According to (1) to (13), since the dilution can be operated based on the change amount of the combustion state in the internal combustion engine, the dilution can be set to the upper limit within the allowable range of change in the combustion state in consideration of the change in the combustion state according to the dilution. Since the dilution can be set to the upper limit within the range of the change in the allowable combustion state, it is possible to set different dilutions for each individual based on a variation for each engine body, and thus it is possible to improve the efficiency at the time of actual traveling for each engine body.

REFERENCE SIGNS LIST 1 air flow sensor
2 electronically controlled throttle
4 supercharger
4$a$ compressor
4$b$ turbine
5 variable valve
6 intake manifold
7 intercooler
9 air-fuel ratio sensor
10 three-way catalyst
11 electronically controlled wastegate valve
12 accelerator opening sensor
13 fuel injection device
14 cylinder
15 exhaust pipe
16 ignition coil
17 spark plug
18 temperature sensor
19 crank angle sensor
20 ECU
21 input circuit
22 input/output port
23$a$ CPU
23$b$ ROM
23$c$ RAM
24 ignition control unit
25 EGR ratio control unit

The invention claimed is:

1. A control device for an internal combustion engine, the control device comprising a processor configured to:
 calculate a change amount of a parameter indicating a combustion state of the internal combustion engine, and
 correct an operation amount of an actuator that adjusts a dilution of an air-fuel mixture according to a difference between the change amount of the parameter indicating the combustion state and a target value of the change amount, and bring the change amount close to the target value, wherein the actuator is an EGR valve, and the processor is configured to increase an opening of the EGR valve as the difference increases in a case where the change amount of the parameter indicating the combustion state is less than the target value, decrease the opening of the EGR valve as the difference increases and advance an ignition timing in a case where the change amount of the parameter indicating the combustion state is more than the target value, and increase discharge energy generated in an ignition device in a case where the change amount does not decrease after the ignition timing is advanced.

2. The control device for the internal combustion engine according to claim 1, wherein the parameter indicating the combustion state is an index having a correlation with a combustion ratio of the air-fuel mixture, a crank angle at which the combustion ratio of the air-fuel mixture takes a predetermined value, a maximum value of an in-cylinder pressure, or a crank angle at which the in-cylinder pressure is maximum.

3. The control device for the internal combustion engine according to claim 1, wherein the parameter indicating the combustion state is a combustion center position, and the processor is configured to estimate an in-cylinder pressure of the internal combustion engine based on a crank angular velocity at a first timing after the ignition timing and a crank angular velocity at a second timing before an exhaust valve is opened, and estimate the combustion center position by using the estimated in-cylinder pressure, or estimate the combustion center position by using an in-cylinder pressure detected by a sensor.

4. The control device for the internal combustion engine according to claim 1, wherein the processor is configured to correct the operation amount of the actuator in a case where an intake system state is a steady state, a traveling state is a constant speed state, or the traveling state is a constant acceleration state.

5. The control device for the internal combustion engine according to claim 1, wherein the change amount is a deviation indicating a difference from a reference value, and the reference value is a value of the parameter indicating the combustion state in a previous combustion cycle.

6. A control device for an internal combustion engine, the control device comprising a processor configured to:

calculate a change amount of a parameter indicating a combustion state of the internal combustion engine, and correct an operation amount of an actuator that adjusts a dilution of an air-fuel mixture according to a difference between the change amount of the parameter indicating the combustion state and a target value of the change amount, and bring the change amount close to the target value, wherein the actuator is an EGR valve, and the processor is configured to increase an opening of the EGR valve as the difference increases in a case where the change amount of the parameter indicating the combustion state is less than the target value, decrease the opening of the EGR valve as the difference increases in a case where the change amount of the parameter indicating the combustion state is more than the target value, calculate a combustion center position based on the parameter indicating the combustion state, advance an ignition timing in a case where an average value of the combustion center positions is out of a predetermined range, and increase discharge energy generated in an ignition device in a case where the average value of the combustion center position is within the predetermined range and the change amount of the parameter indicating the combustion state is more than the target value.

7. The control device for the internal combustion engine according to claim 6, wherein the parameter indicating the combustion state is an index having a correlation with a combustion ratio of the air-fuel mixture, a crank angle at which the combustion ratio of the air-fuel mixture takes a predetermined value, a maximum value of an in-cylinder pressure, or a crank angle at which the in-cylinder pressure is maximum.

8. The control device for the internal combustion engine according to claim 6, wherein the processor is configured to estimate an in-cylinder pressure of the internal combustion engine based on a crank angular velocity at a first timing after an ignition timing and a crank angular velocity at a second timing before an exhaust valve is opened, and estimate the combustion center position by using the estimated in-cylinder pressure, or estimate the combustion center position by using an in-cylinder pressure detected by a sensor.

9. The control device for the internal combustion engine according to claim 6, wherein the processor is configured to correct the operation amount of the actuator in a case where an intake system state is a steady state, a traveling state is a constant speed state, or the traveling state is a constant acceleration state.

10. The control device for the internal combustion engine according to claim 6, wherein the change amount is a deviation indicating a difference from a reference value, and the reference value is a value of the parameter indicating the combustion state in a previous combustion cycle.

* * * * *